(12) United States Patent
Mogi et al.

(10) Patent No.: US 7,325,096 B2
(45) Date of Patent: Jan. 29, 2008

(54) COMPUTER SYSTEM, STORAGE SUBSYSTEM, AND WRITE PROCESSING CONTROL METHOD

(75) Inventors: Kazuhiko Mogi, Kanagawa (JP); Norifumi Nishikawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 235 days.

(21) Appl. No.: 11/182,867

(22) Filed: Jul. 18, 2005

(65) Prior Publication Data

US 2006/0224825 A1   Oct. 5, 2006

(30) Foreign Application Priority Data

Mar. 30, 2005  (JP) .............. 2005-098350

(51) Int. Cl.
    *G06F 12/00*  (2006.01)
(52) U.S. Cl. .......................... 711/113
(58) Field of Classification Search ......... 711/113
    See application file for complete search history.

(56) References Cited

U.S. PATENT DOCUMENTS

| | | | |
|---|---|---|---|
| 4,394,732 A * | 7/1983 | Swenson ............... | 711/113 |
| 4,530,055 A * | 7/1985 | Hamstra et al. ......... | 711/136 |
| 5,745,792 A * | 4/1998 | Jost ..................... | 710/58 |
| 6,098,153 A * | 8/2000 | Fuld et al. ............. | 711/134 |
| 6,453,386 B1 * | 9/2002 | Jeffries et al. .......... | 711/133 |
| 7,171,516 B2 * | 1/2007 | Lowe et al. ............ | 711/113 |
| 2005/0050279 A1 * | 3/2005 | Chiu et al. ............. | 711/137 |
| 2006/0085598 A1 | 4/2006 | Nemoto et al. | |

FOREIGN PATENT DOCUMENTS

| | | |
|---|---|---|
| JP | 2003-150419 | 5/2003 |
| JP | 2004-302751 | 10/2004 |

OTHER PUBLICATIONS

Varma et al. "Destage Algorithms for Disk Arrays with Nonvolatile Caches", IEEE Trans. on Comp. Feb. 1998.*
Nam et al. An Adaptive High-Low Water Mark Destage Algorithm for Cached RAID5, Proc 2002 Pacific Rim Symp. on Dependable Computing.*

(Continued)

*Primary Examiner*—Matthew Kim
*Assistant Examiner*—John P Fishburn
(74) *Attorney, Agent, or Firm*—Mattingly, Stanger, Malur & Brundidge, P.C.

(57) ABSTRACT

A computer system is provided with a collection section for collecting load information related to an application server and a storage subsystem, a transmission section for predicting a write processing property based on the load information collected by the collection section and for transmitting the write processing property to the storage subsystem, and a write control section for controlling a write processing to a hard disk drive in the storage subsystem based on the write processing property transmitted by the transmission section. A target of the writable cache amount is set so that a write processing amount from a cache of the storage subsystem to the hard disk drive is averaged in terms of time, and the write processing to the hard disk drive is performed to satisfy the target of the writable cache amount.

13 Claims, 21 Drawing Sheets

OTHER PUBLICATIONS

Marc Farley, Building Storage Networks, second edition, 2001.*

"Destage Algorithms for Disk Arrays with Non-Volatile Caches" by Varma, et al. pp. 83-95.

Multimedia Storage Servers: A Tutorial by Gemmell, et al. pp. 40-49. 1995 IEEE.

"Destage Algorithms for Disk Arrays with Non-Volatile Caches" by Varma, et al. pp. 83-95, Jun. 1995.

* cited by examiner

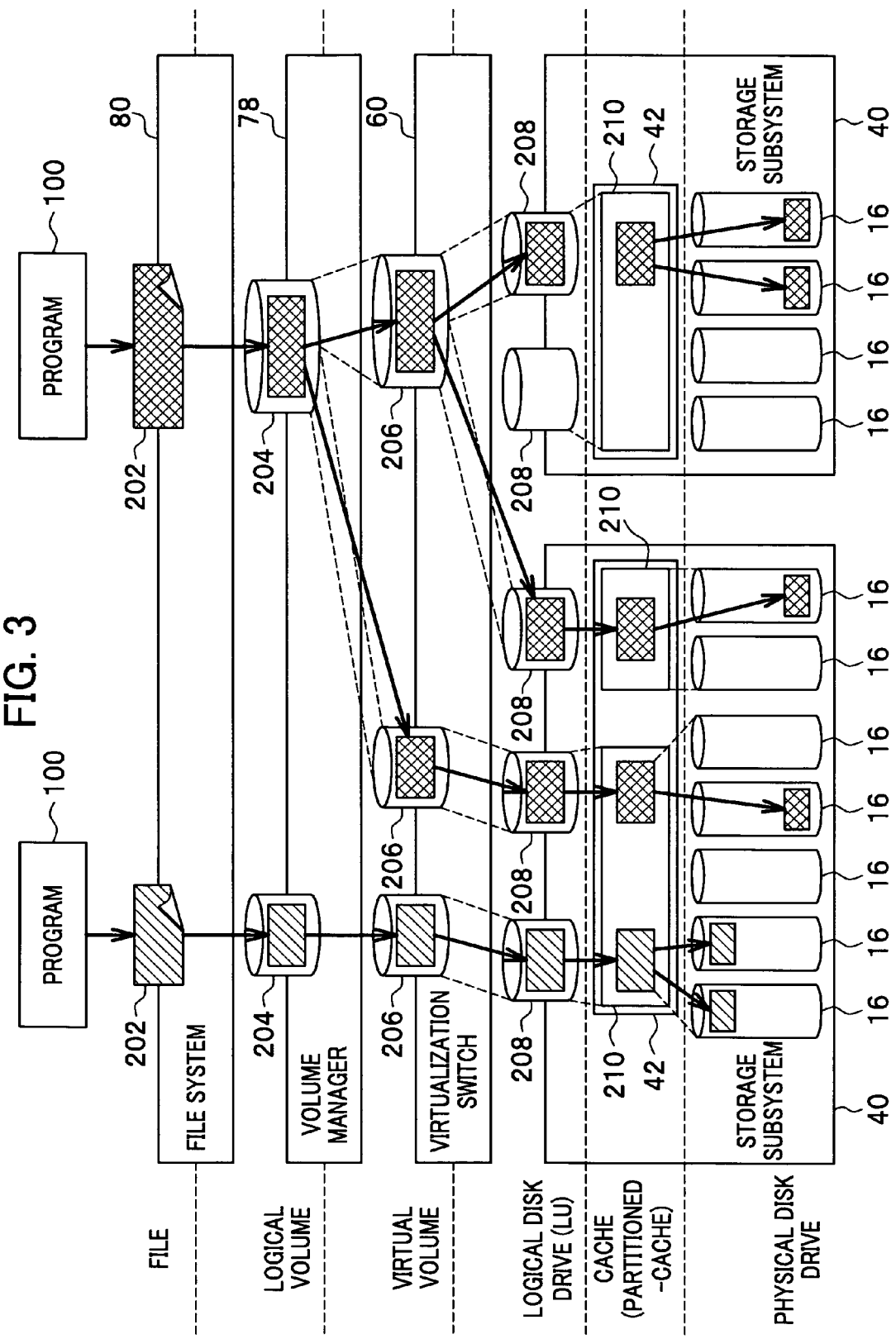

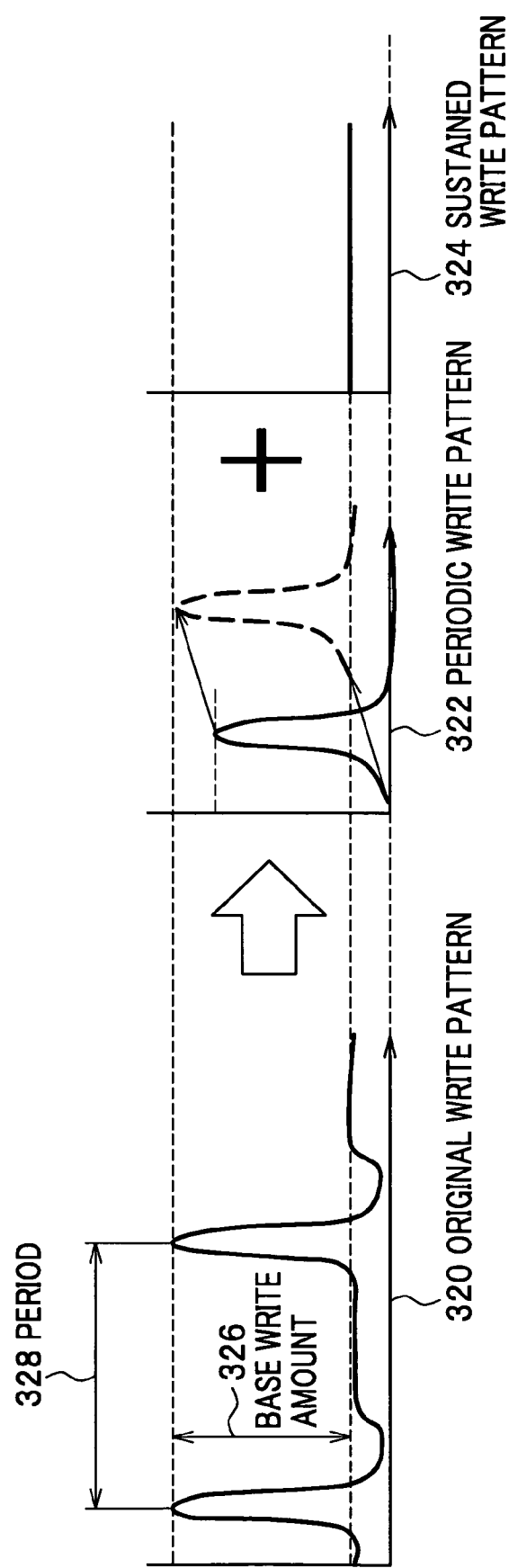

FIG. 5

MANAGEMENT INFORMATION

| UPPER VIRTUALIZED STORAGE OBJECT INFORMATION 330 | | LOWER MANAGED STORAGE OBJECT INFORMATION 332 | | | DATA TRANSFER CUMULATIVE AMOUNT (kB) 334 | |
|---|---|---|---|---|---|---|
| VIRTUALIZED STORAGE OBJECT ID | AREA IN STORAGE OBJECT | VIRTUALIZATION MECHANISM ID | MANAGED STORAGE OBJECT ID | AREA IN STORAGE OBJECT | READ | WRITE |
| Lower 0 | 0 – 10239 | LowApp0 | Lower 0 | 0 – 10239 | 3920 | 2678 |
| Lower 0 | 10240 – 20479 | LowApp1 | Lower 1 | 0 – 10239 | 78671 | 478 |
| Lower 0 | 0 – 10239 | LowApp0 | Lower 0 | 10240 – 20479 | 5714 | 287689 |
| Lower 0 | 10240 – 20479 | LowApp1 | Lower 1 | 0 – 10239 | 687121 | 0 |
| Lower 0 | 0 – 10239 | LowApp2 | Lower 0 | 0 – 10239 | 68615 | 52394 |
| ... | ... | LowApp2 | Lower 1 | ... | 423905 | 12893 |
| | | ... | ... | | ... | ... |

| | | |
|---|---|---|
| JOB IDENTIFIER: Job 1 | | ~412 |
| SERVER NAME: svr1 | | ~414 |
| COMMAND NAME: /job/cmd1 | | ~416 |
| ACTIVATION CONDITION | | ~418 |

| | | | |
|---|---|---|---|
| 420 | FILE PATH NAME | /dat/aaa | /data/bbb |
| 422 | DURATION | 0 to 30 MIN. | 30 to 40 MIN. |
| 424 | BASE WRITE THROUGHPUT | — | 10 MB/SEC |
| 426 | BASE WRITE PERIOD | 60 SEC | — |
| 428 | BASE WRITE AMOUNT | 1 MB | — |
| 430 | BASE MONITORED VALUE | 8797 TIMES/SEC | 10MB/SEC |
| 432 | BASE MONITOR POINT | PROCESSING COUNTER | WRITE AMOUNT |
| 434 | PRESENT SET COMPUTATION MONITORED VALUE | 9532 TIMES/SEC | — |

WRITE PROCESSING INFORMATION (PRESENT SET VALUE) ~438

JOB MANAGEMENT INFORMATION ~410

FIG. 8B

| | | | | |
|---|---|---|---|---|
| 442 | JOB IDENTIFIER | Job 1 | Job 2 | ... |
| 444 | JOB ACTIVATION TIME | 2005/3/1 14:00:00 | 2005/3/1 14:00:15 | ... |

RUNNING JOB MANAGEMENT INFORMATION ~440

FIG.10

| | | | | |
|---|---|---|---|---|
| 482 | PARTITIONED-CACHE ID | CG1 | CG2 | ... |
| 484 | LU ID | LU 0, LU 2, LU4 | LU 1, LU 3, LU5 | ... |
| 486 | CACHE AMOUNT | 1024MB | 128 MB | ... |
| 488 | WRITE PRIORITIZATION THRESHOLD VALUE | 512 MB | 96 MB | ... |
| 490 | DIRTY DATA AMOUNT | 80.2 MB | 64 MB | ... |
| 492 | EXPECTED WRITE THROUGHPUT | 1.00 MB/sec | 1.50 MB/sec | ... |
| 494 | NEXT-EXPECTED DIRTY DATA AMOUNT | 80.05 MB | 63.85 MB | ... |
| 496 | CORRECTION DIRTY DATA AMOUNT | 4.6 MB | 0 | ... |
| 498 | HDD IDLING TIME WRITE AMOUNT | 7kB | 8kB | ... |

STORAGE CACHE MANAGEMENT INFORMATION

| | | | |
|---|---|---|---|
| PREVIOUS WRITE AMOUNT HISTORY UPDATE TIME: 2005/3/1 14:04:05 | | | |
| PARTITIONED-CACHE ID | CG 1 | CG 1 | CG 2 |
| WRITE PROCESSING INFORMATION ID | WI 1A | WI 1B | WI 2A |
| PREVIOUS PERIOD WRITE TIME | 2005/3/1 14:00:00 | 2005/3/1 14:00:15 | 2005/3/1 14:05:04 |
| PERIODIC WRITE STATE | NOT YET PROCESSED | — | IN PROCESS |
| PRESENT WRITE AMOUNT COUNTER (kB) | 0 | 4 | 0 |
| CORRECTION FACTOR | −0.5% | −0.5% | +2% |
| WRITE AMOUNT HISTORY (kB) 2005/3/1 12:00:00 ~ 12:00:01 | 408 | 5 | 32 |
| 2005/3/1 12:00:01 ~ 12:00:02 | 327 | 5 | 0 |
| 2005/3/1 12:00:03 ~ 12:00:03 | 0 | 5 | 31 |
| ... | ... | ... | ... |

WRITE AMOUNT MANAGEMENT INFORMATION 502, 504, 506, 508, 510, 512, 514, 516

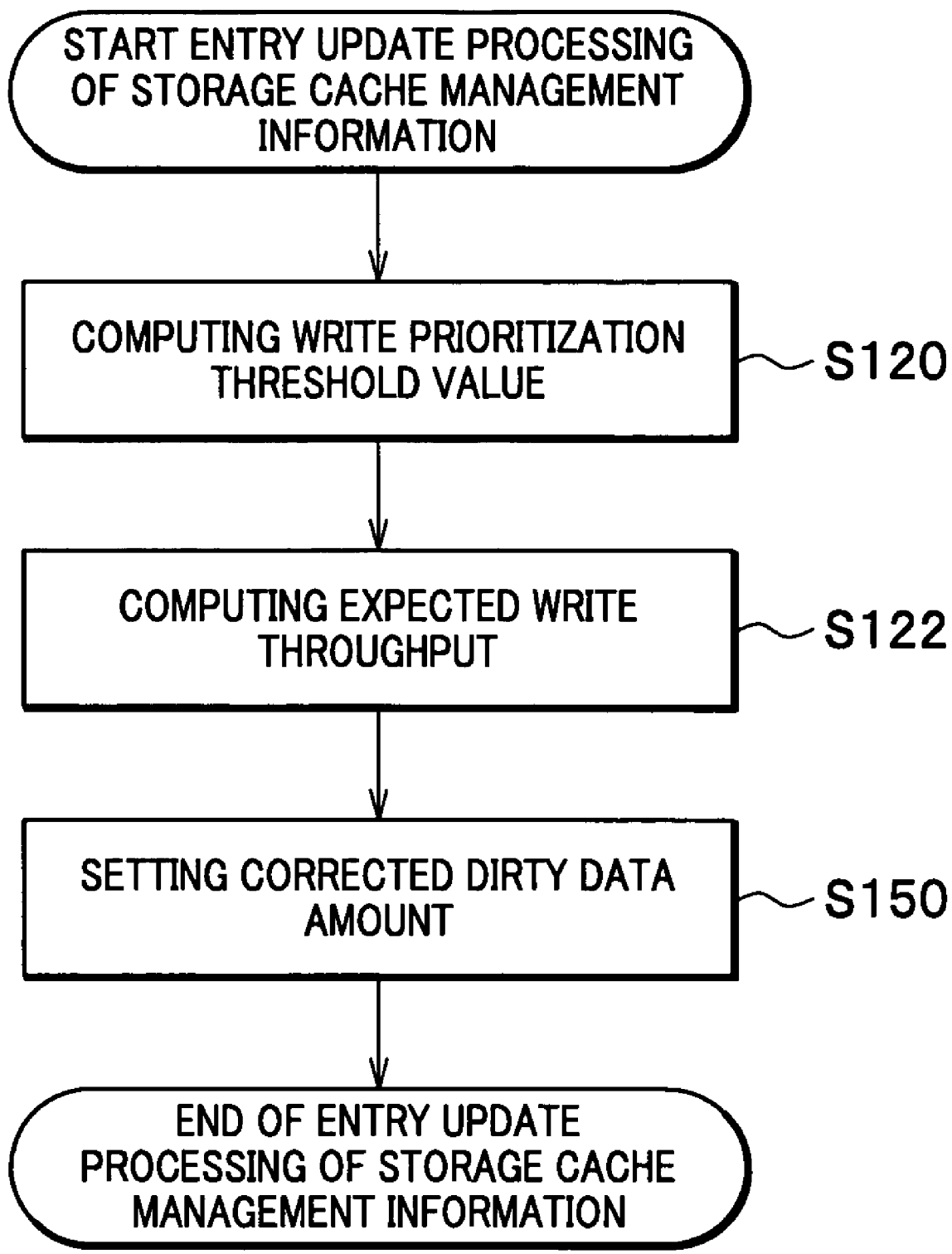

COMPUTER SYSTEM, STORAGE SUBSYSTEM, AND WRITE PROCESSING CONTROL METHOD

CROSS-REFERENCE TO RELATED APPLICATIONS

This application claims the foreign priority benefit under Title 35, United States Code, § 119 (a)-(d), of Japanese Patent Application No. 2005-098350, filed on Mar. 30, 2005 in the Japan Patent Office, the disclosure of which is herein incorporated by reference in its entirety.

BACKGROUND OF THE INVENTION

1. Field of the Invention

The present invention relates to a computer system, a storage subsystem, and a write processing control method.

2. Description of the Related Art

The performance of the storage subsystem has been improved by effectively utilizing a cache. For example, the storage subsystem holds data likely to be reread very soon in the cache, thereby the data can be read at high speed when the data is reread. Moreover, by reporting the end of write operation for written data from server as soon as it is stored into the cache, even when the storage subsystem does not write it into a hard disk drive, the server can execute the next processing promptly. However, even when the storage subsystem is provided with the cache, the improvement in speed by utilizing the cache cannot be achieved when the performance of the storage subsystem is limited by the read/write speed of the hard disk drive, that is, the storage subsystem performance is affected by the method by which the read/write processing of the hard disk drive is performed.

An example of the write (destage) processing algorithm into the hard disk drive from the cache in the conventional storage subsystem is a High/Low Mark Algorithm (see Anujan Varma and Quinn Jacobson, "Destage Algorithm for Disk Arrays with Non-Volatile Caches," Proceeding of the 22nd International Symposium on Computer Architecture, pp. 83-95 (1995)). In the algorithm, when an amount of dirty data in the cache, which differs from the one stored in the hard disk drive caused by rewriting the data into the cache, exceeds a predetermined activation threshold value, a destage processing is activated, while the destage processing is terminated when the amount falls below a predetermined threshold value. Moreover, a similar one is the Linear Threshold Scheduling, where the data with the write cost lower than the upper limit, which will be modified according to the amount of dirty data, is destaged from the cache.

However, since such writing methods execute the destage processing based on the dirty data amount, when the write requests are gathered to the storage subsystem, the pace of destage processing must be changed in conjunction therewith. Furthermore, when the write operations are gathered to the hard disk drive due to the destage processing, it results in the decrease in readout performance from the hard disk drive. In order to prevent the decrease in read performance upon the write processing concentration, it is considered to apply the technology for scheduling the access by stabilizing a data transmission speed, as described in D. J. Gemmell et al, "Multimedia Storage Servers: A Tutorial," IEEE Computer, pp. 40-49, May (1995). However, since the data transmission speed required for the general processing is unknown, the technology as described above cannot be applied directly for the destage control in a practical environment.

In the prior art described above, the practical scheduling of the internal access in the storage subsystem is not sufficiently realized, so that the read performance of the storage subsystem is decreased when the write requests are gathered to the storage subsystem. In view of the situation above, the present invention intends to prevent the decrease in performance of read access even when the write requests are gathered under a practical environment.

SUMMARY OF THE INVENTION

In order to solve the above-described problems, according to the present invention, a computer system is provided with a collection section for collecting load information related to an application server and a storage subsystem, a transmission section for predicting a write processing property based on the load information collected by the collection section and for transmitting the write processing property to the storage subsystem, and a write control section for controlling a write processing to a hard disk drive in the storage subsystem based on the write processing property transmitted by the transmission section, wherein the write processing to the hard disk drive is performed so that a write processing amount from a cache of the storage subsystem to the hard disk drive is averaged in terms of time. In order to achieve the temporal averaging of the write processing amount, a target of writable cache amount or write throughput is given a set target value and controlled to satisfy the value.

According to the configuration described above, the storage subsystem can maintain a predetermined read access performance even when the write requests are gathered to the storage subsystem.

According to the present invention, a response time of read requests to the storage subsystem will not be changed in terms of time, even when the write requests are gathered to the storage subsystem. Therefore, the stable access performance can be assured.

BRIEF DESCRIPTION OF THE DRAWINGS

FIG. 3 is a schematic diagram showing a mapping from data of a file to a physical disk drive (a hard disk drive);

FIG. 4 is a diagram illustrating a separation method of a periodic write pattern and a sustained write pattern;

FIG. 5 is a diagram illustrating management information;

FIG. 8A is a diagram illustrating job management information, and FIG. 8B is a diagram illustrating running job management information;

FIG. 10 is a diagram illustrating storage cache management information;

FIG. 11 is a diagram illustrating write amount management information;

FIG. 21 is a diagram illustrating an entry update processing of storage cache management information according to the second embodiment.

DETAILED DESCRIPTION OF THE PREFERRED EMBODIMENTS

First Embodiment

A first embodiment of the present invention will now be described with reference to the drawings. First, a system configuration according to the first embodiment will be described, and then an access processing in a computer system 1 will be described.

System Configuration

Figure 1:
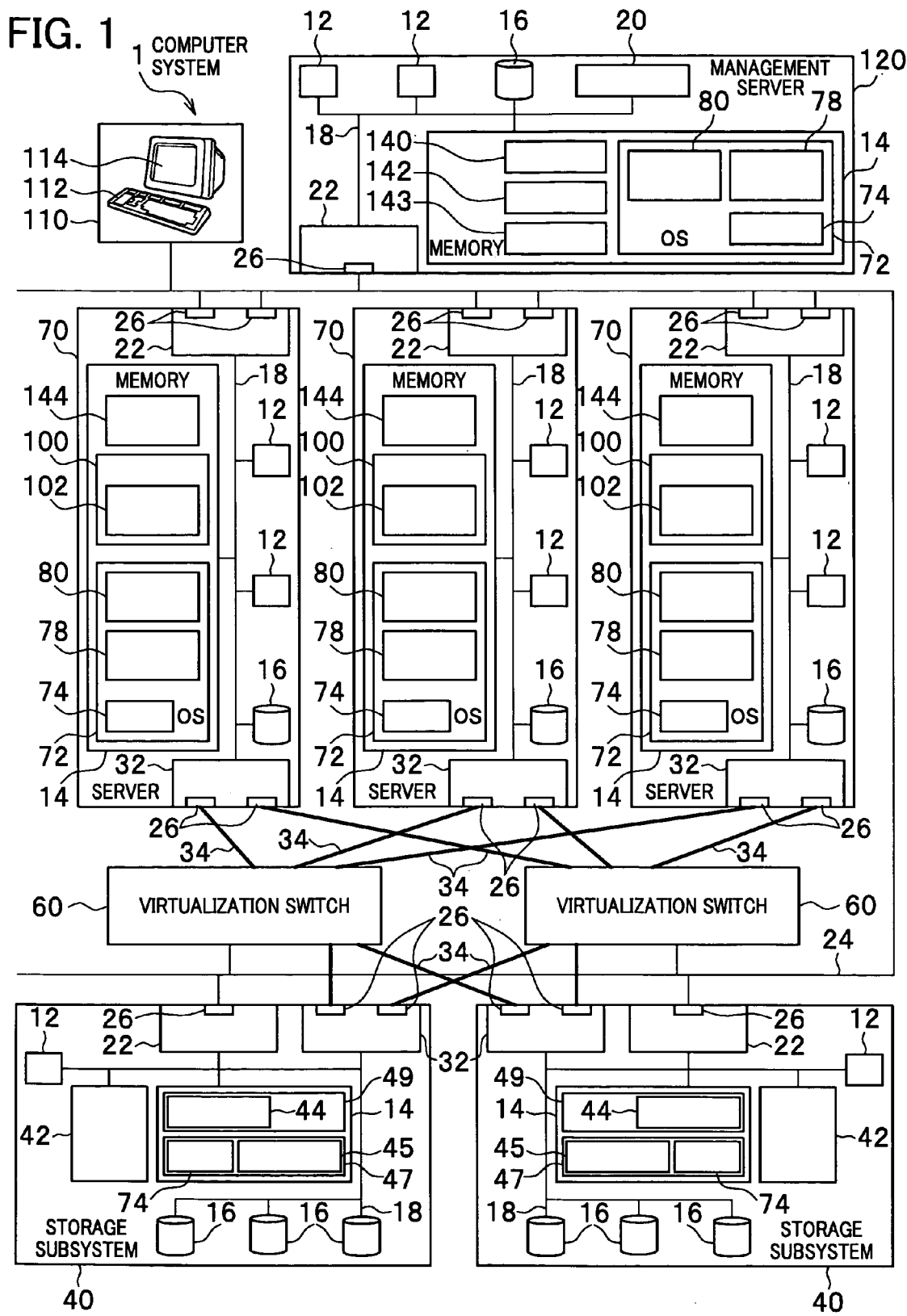
FIG. 1 is a schematic diagram of a computer system according to a first embodiment.

FIG. 1 is a block diagram of a computer system according to the first embodiment. The computer system 1 is composed of a management server 120, a server (an application server) 70, a virtualization switch 60, and a storage subsystem 40, wherein they are connected by a network 24 and an I/O path 34. The network 24 may be configured by a Gigabit Ethernet (registered trademark), and the network standard is not limited. Moreover, the I/O path 34 may be configured by a Fiber Channel, though the standard is not limited thereto. In the computer system 1, a terminal 110 provided with an input means 112 and a display means 114 is connected to the network 24.

Configuration of the Management Server

The management server 120 is a computer composed of one or more CPUs 12, a memory 14, a hard disk drive 16, and a network interface (referred to as a network I/F hereinafter) 22, wherein they are connected by a bus 18. The management server 120 may be provided with a reader of a storage medium, such as a CD-ROM drive 20.

The CPU 12 is to perform a predetermined processing and the type thereof is not limited. The memory 14 may be configured by for example a semiconductor memory, and the memory type is not limited. Although the hard disk drive 16 may be of a standard hard disk drive, it may be replaced by a different storage means such as a nonvolatile semiconductor memory. The network I/F 22 may be configured by, for example, a network interface card adapted for the Gigabit Ethernet (registered trademark), though the network standard is not limited. Here, the network I/F 22 includes a port 26 to be connected to the network.

In the memory 14 of the management server 120, an operating system (referred to as an OS hereinafter), a processing management program 140, processing management information 142, and a write processing information 143 are stored. An OS 72 includes management information 74, a volume manager 78, and a file system 80. The OS 72 is a program, and in addition, the volume manager 78 and the file system 80 are programs to make the OS 72 workable. The volume manager 78 is the program for managing volumes used by the OS 72, and the file system 80 is the program for providing a function using the volume to store files or directories.

The processing management program 140 is the program for managing the access to the storage subsystem 40 by a processing performed by a later-described server 70. The information collected by the processing management program 140 is stored in the processing management information 142. However, the information such as a write data amount related to a write processing performed by the server 70 is stored in the write processing information 143.

Configuration of the Server

Next, the configuration of the server 70 will be described. Although three servers 70 are shown in FIG. 1, they have substantially the same configurations.

The server 70 is a computer substantially the same in configuration as that of the management server 120, and is composed of one or more CPUs 12, the memory 14, the hard disk drive 16, the network interface (referred to as the network I/F hereinafter) 22, and the I/O path I/F 32, connected by the bus 18. The same numerals are assigned to the same components with the management server 120, and the description thereof will be omitted. The I/O path I/F 32 has the function to communicate with the virtualization switch 60 or the storage subsystem 40, which will be described later, via the I/O path 34. The I/O path I/F 32 includes the port 26 where the I/O path 34 is connected thereto, and the port 26 may be more than one.

The other components are the same as that described above except for the difference in the programs or the data stored in the memory 14.

In the memory 14 of the server 70, the OS 72, one or more programs 100 and a management agent 144 are stored. The OS 72 is the same as the OS 72 of the above-described management server 120, so that the description thereof will be omitted. The program 100 is an application program which issues read/write requests to the storage subsystem 40. The program 100 here may be a database management system, for example. The number of program 100 executed in the system is not limited.

A program statistics 102 includes the information about files used by processing or the write operations regarding the above-described program 100. The program statistics 102 may be generated by the CPU 12 using the above-described program 100 itself or using the later-described management agent 144. The program statistics 102 will be described later in detail.

The management agent 144 is a program having functions to make the CPU 12 manage the program statistics 102 related to the above-described program 100 and to read out the program statistics 102 and transmit the readout to the management server 120. In this embodiment, collection and transmission sections are realized by the CPU 12 by processing the agent 144 in the memory 14. The collection section collects load information related to the server 70 and the storage subsystem 40. The transmission section predicts write processing property based on the load information collected by the collection information, and transmits the write processing property to the storage subsystem.

Although the computer system 1 in FIG. 1 is configured to include the three servers 70, the other two servers 70 have the same configurations as described above so that the description thereof will be omitted.

The virtualization switch 60 has a mapping function by which a logical volume can be configured from a plurality of logical disks if required. The configuration of the virtualization switch 60 will be described later by referring to FIG. 2.

Configuration of the Storage Subsystem

The storage subsystem 40 is a computer composed of the CPU 12, the memory 14, the hard disk drive 16, the network I/F 22, the I/O path I/F 32, and a disk cache 42, connected by the bus 18. The common components with the management server 120 and the server 70 are assigned the same numerals and description thereof will be omitted, and the disk cache 42 which is not included therein will be described here. The disk cache 42 is a storage means serving as a cache for the hard disk drive 16 of the storage subsystem 40. The disk cache 42 can be configured using a semiconductor memory. While the disk cache 42 is distinguished from the memory 14 in this embodiment, it may be configured as the predetermined area in the memory 14, that is, the configuration of the disk cache 42 is not limited.

The memory 14 of the storage subsystem 40 includes a data area 47 and a program area 49. The data area 47 includes the management information 74 and the write processing information 45. Although the management information 74 is identical to that described above in the embodiment, the management information 74 in the management server 120, the server 70, the virtualization switch 60 and the storage subsystem 40 are not always identical in general. The write processing information 45 is the information to control the write processing in the storage subsystem 40, and holds the necessary information according to the performed processing such as the periodic write processing, the sustained write processing, and the deletion of information. The above-described disk cache 42 may be contained in the data area 47.

The program area 49 includes a control program 44. Using the control program 44, the CPU 12 controls the read/write processing of the storage subsystem 40.

Here, the storage subsystem 40 may be provided with a plurality of hard disk drives to configure the required capacity, the number of hard disk drives is not limited.

Configuration of the Virtualization Switch

Figure 2:
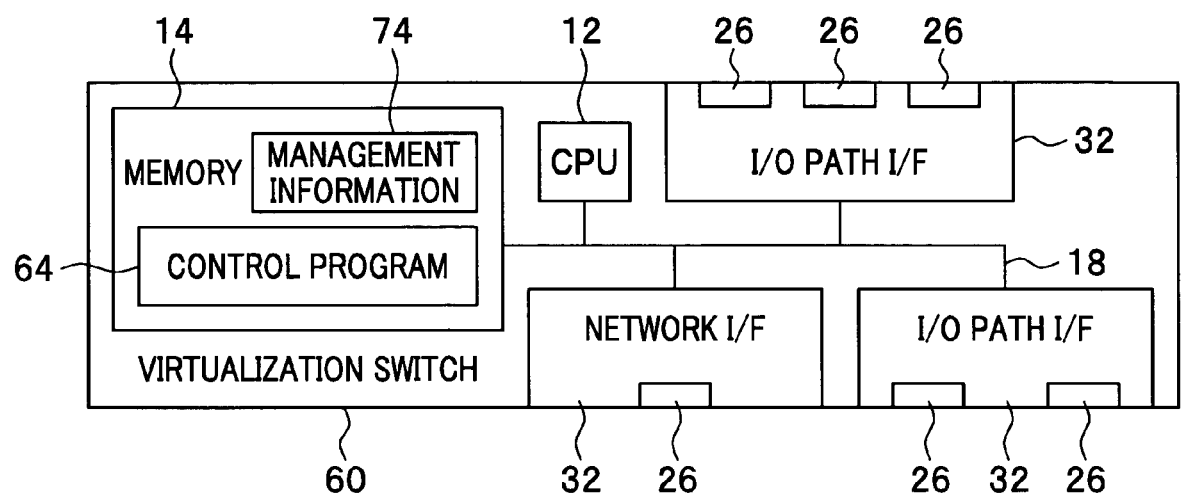
FIG. 2 is a schematic diagram of a virtualization switch.

FIG. 2 is a block diagram of the virtualization switch. The virtualization switch 60 is the computer composed of the CPU 12, the memory 14, the network I/F 22, and the I/O path I/F 32, connected by the bus 18. All the components are identical to those described above, so that the same numerals are assigned thereto and the description will be omitted. The memory 14 includes the management information 74 and a control program 64 which is the program to make the switch 60 perform as the virtualization switch. Although a plurality of the I/O path I/F 32 is generally contained in the virtualization switch 60, the number thereof is not limited to a specific number.

The virtualization switch 60, owing to the above configuration, has a function to make virtual volumes, by which a part of storage region in a logical volume are mapped to a part of storage region of a logical disk if required. Therefore, for example, when the single logical volume is partitioned and stored into a plurality of the storage subsystems 40 and then referenced by a file system 80 (see FIG. 3) or a logical volume 204, the partitioned data are combined to restore it to the original data. Moreover, the above-described management information 74 stores the information for managing the mapping.

FIG. 3 is a schematic diagram illustrating the mapping from the data of the file to a physical disk drive (the hard disk drive).

When writing a file 202 belonging to a file system 80 by the program 100, the single data of the file is initially managed as a chunk of data. The data of the file 202 is mapped to a logical volume 204 managed by the volume manager 78 using the CPU 12 of the server 70 (see FIG. 1). The data of the file 202 stored as such into the logical volume 204 is mapped to one or a plurality of virtual volumes 206 managed by the virtualization switch 60 using the function of the volume manager 78. Moreover, the virtual volume 206 is mapped to a logical disk 208 managed by the storage subsystem 40 using the CPU 12 of the virtualization switch 60 (see FIG. 2).

The data written in the logical disk 208 is stored into a partitioned-cache 210 in the cache (the disk cache) 42 by the CPU 12 of the storage subsystem 40 (see FIG. 1) and then recorded in the corresponding physical disk (the hard disk drive) 16. While the data is mapped from the logical volume 204 to the virtual volume 206, from the virtual volume 206 to the logical disk 208, and from the partitioned-cache 210 to the hard disk drive (the physical disk drive) 16 as described above, a chunk data can be partitioned and mapped to a plurality of the areas.

Next, the processing of the read/write operation on the hard disk drive using the cache will be described by referring to FIG. 1.

First, upon receiving a read or write request from the server 70, the request is added to a server I/O queue (not shown) by the CPU 12 of the storage subsystem 40. If it is the read request, the CPU 12 performs the server I/O processing corresponding to the read. In a case that the read request is for the data which is not stored in the cache (a read cache miss), the read request is added to a HDD I/O queue (not shown), then the request is performed to the hard disk drive 16 sequentially and the content thereof is stored into the cache. Hereinafter, in this specification, a read instruction which is executed in the storage subsystem 40 refers to the processing to add the read request to the HDD I/O queue as described above.

Similarly, upon receiving a write request from the server 70, the CPU 12 adds the request to the server I/O queue. As a result, after the server I/O processing corresponding to the write request is performed, the content thereof is written into the cache and the state of the cache in the data area goes to the dirty state. When the CPU 12 performs a dirty write processing corresponding to the cache state, the corresponding write request is added to the HDD I/O queue, the request is performed to the hard disk drive 16 sequentially, and the content thereof is stored into the hard disk drive 16. Hereinafter, in this specification, a write instruction which is executed in the storage subsystem refers to the processing to add the write request to the HDD I/O queue as described above. Here, the read request and the write request are added to the same HDD I/O queue, and the requests are in a relationship to affect each other.

FIG. 4 is a diagram illustrating a separation method of a periodic write pattern and a sustained write pattern.

A pattern of the data amount written in the write processing by the CPU 12 of the storage subsystem 40 can be divided into a component which is periodically repeated and a sustained write pattern as a base. For example, the write pattern is such as an original write pattern 320 shown in FIG. 4, it can be divided into a periodic write pattern 322 and a sustained write pattern 324. In this example, a base write amount and a write period are indicated by numerals 326 and 328, respectively. In this specification, the base write amount and the period refer to the same amounts therewith, respectively.

Configuration of Various Information Tables

FIG. 5 is a diagram illustrating the management information. As shown in FIG. 5, the management information 74 is composed of upper virtualized storage object information 330, a lower managed storage object information 332, and a data transfer cumulative amount 334. The upper virtualized storage object information 330 holds a virtualized storage object ID and an area information within the object. The virtualized storage object ID is for specifying the virtualized storage object, and a virtualization mechanism refers to the file system 80, a volume manager 78, a virtualization switch 60, and a storage subsystem 40 shown in FIG. 3. The virtualized storage object refers to the file 202, the logical volume 204, the virtual volume 206, or the logical disk drive 208 shown in FIG. 3. A managed storage object refers to the virtualized storage objects and the physical hard disk drive. The upper virtualized storage object information 330 maintains the mapping between the upper hierarchy and the hierarchy managed by the management information 74 among the hierarchies shown in FIG. 3. Similarly, the lower managed storage object information 332 holds the virtualization mechanism, a managed storage object and the area information of the object, thereby the mapping between the hierarchy managed by the management information 74 and the lower hierarchy is maintained. The data transfer cumulative amount 334 records the amounts of data which are read and written corresponding to the respective areas.

Figure 6:
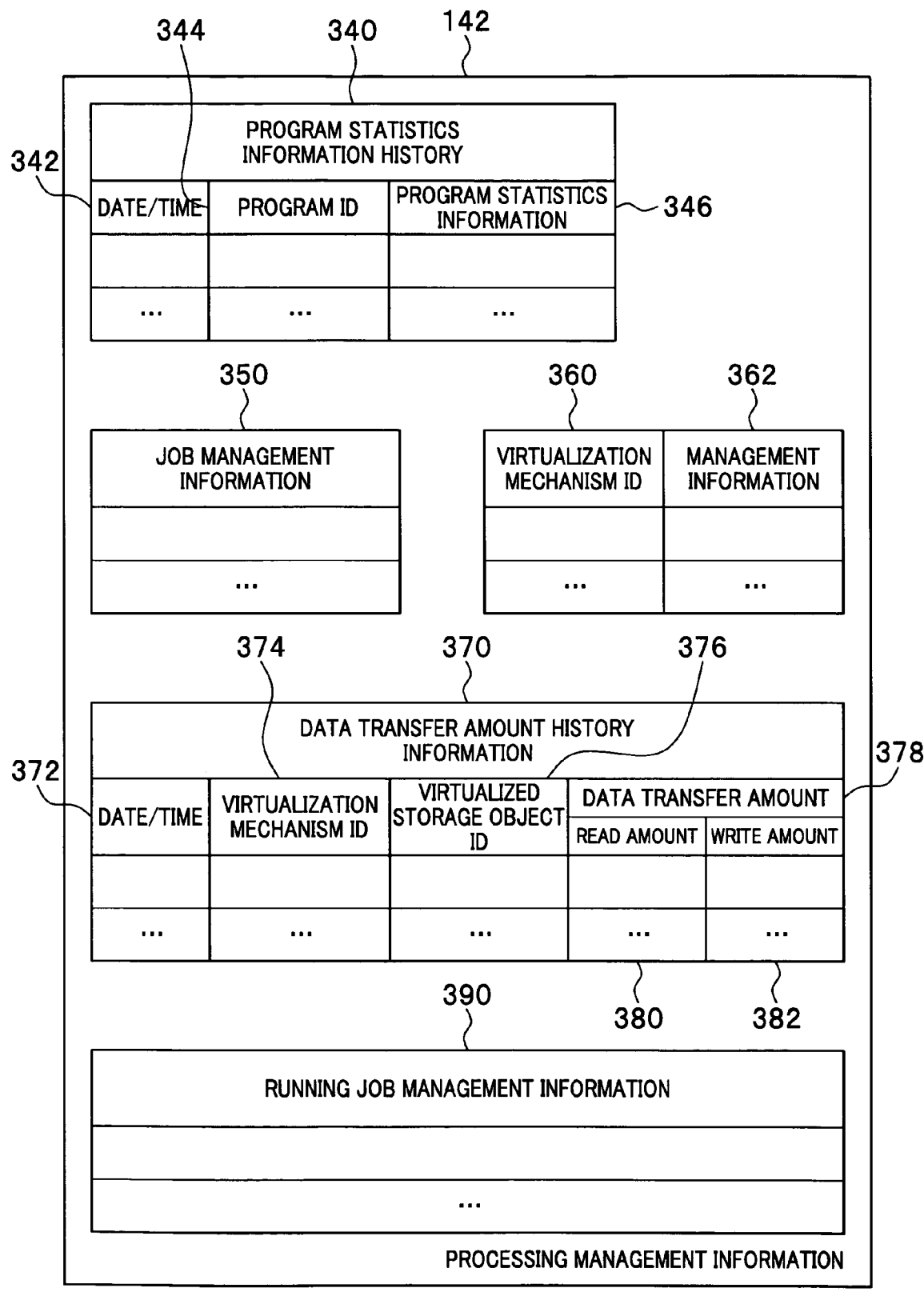
FIG. 6 is a diagram illustrating processing management information.

FIG. 6 is a diagram illustrating the processing management information. The processing management information 142 is composed of a program statistics history information 340, a job management information 350, a virtualization mechanism ID 360 and a management information 362 corresponding thereto, a data transfer amount history information 370, and a running job management information 390. The program statistics information history 340 includes a date/time 342, a program ID 344 and program statistics information 346, storing the program statistics information 346 of each of the programs in time series.

The job management information 350 is created for each of the jobs executed in the server 70 containing the processing management information 142. Corresponding to each of the jobs previously performed, the running jobs, and the jobs to be performed, the job management information 350 is created. The management information 362 is recorded being associated with the virtualization mechanism ID 360.

The data transfer amount history information 370 is the table to record the data transfer amount from the virtualization mechanism located upstream to a lower virtualized storage object ID 376, corresponding to a date/time 372, a virtualization mechanism ID 374, and the virtualized storage object ID 376. The running job management information 390 is the table to record the jobs in running state at the time among the jobs in the job management information 350.

Figure 7:
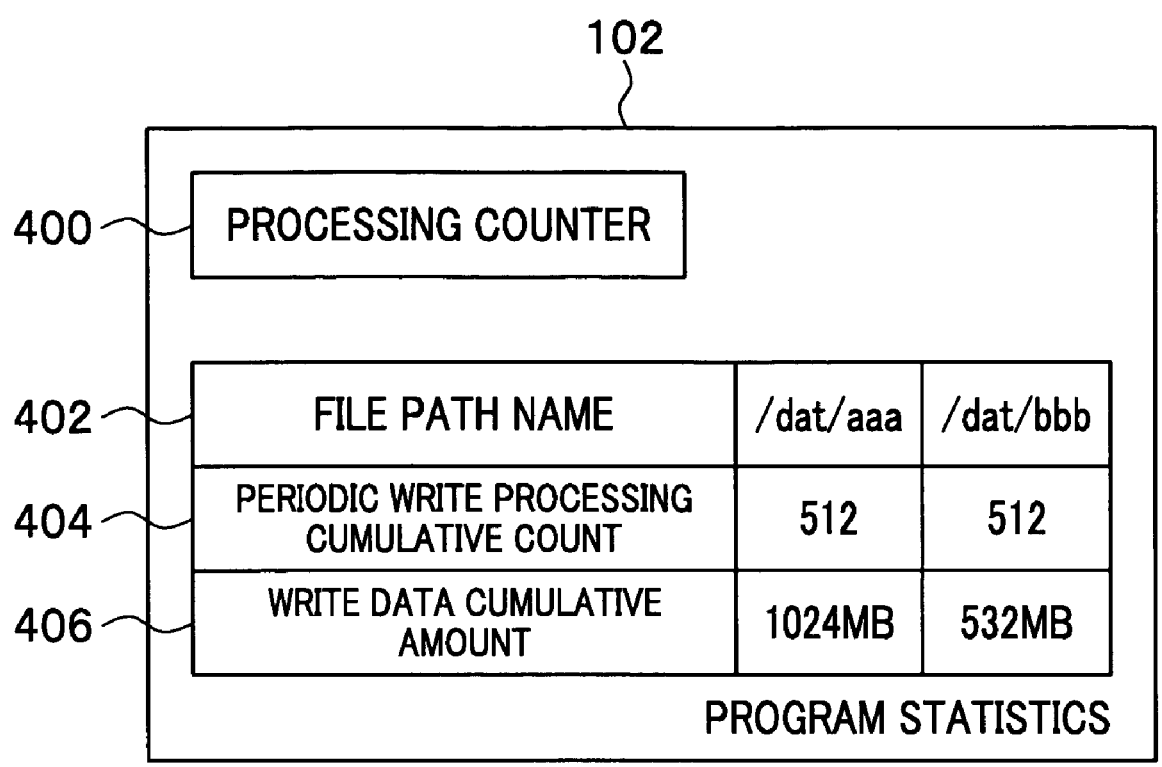
FIG. 7 is a diagram illustrating the program statistics information.

FIG. 7 is a diagram illustrating the program statistics. The program statistics 102 is composed of a processing counter 400, a file path name 402, a periodic write processing cumulative count 404, and a write data cumulative amount 406. The processing counter 400 is the value for counting the number of processings performed by the target program 100. The file path name 402 records the path name of the file to which the program 100 performs the write processing. The periodic write processing cumulative count 404 is the cumulative value of the number of performed periodic write processing shown in FIG. 4. The write data cumulative amount 406 records the cumulative value of the data amount to which the write processing including the periodic write is performed.

FIG. 8A is a diagram illustrating the job management information, and FIG. 8B is a diagram illustrating the running job management information.

A job management information 410 in FIG. 8A includes a job identifier 412, a server name 414, a command name 416, an activation condition 418, a file path name 420, a duration 422, a base throughput 424, a base write period 426, a base write amount 428, a base monitored value 430, a base monitor point 432, a present set computation monitored value 434, and a write processing information 438 set at the time. The job identifier 412 records the job ID, the server name 414 records the server name where the job is executed, the command name 416 records the command name executed in the job, and the activation condition 418 records the activation condition such as the options for the command activation, or the timing information of the command activation regarding when the command is (or should be) executed, i.e., (1) always activated, (2) activated at a specific date and time, or (3) activated when a specific job is completed.

The file path name 420 indicates the file for the write processing performed by the job. The items from the duration 422 to the base monitored point 432 are the items to be set by an administrator based on the monitored information collected when the job is executed. The duration 422 indicates which duration of job execution the write processing is performed to the file having the write property indicated by the following information. The base write throughput 424 presents the base throughput for the sustained write. The base write period 426 and the base write amount 428 are the items corresponding to the periodic write. The base monitored value 430 stores the monitored value at the base monitor point 432 in the duration when the monitored information is collected for setting the base write throughput 424 through the base write amount 428. The base monitor point 432 includes: (1) the processing counter of the program (the value converted to the number of processings per unit time); (2) the write data cumulative amount of the corresponding program (the amount converted to the data amount per unit time); (3) the data transfer amount for write operation of the corresponding virtualized storage object (the amount converted to the data transfer amount per unit time).

While only one is shown in FIG. 8A, a plurality of the write processing information 438 may be present. As for the write processing information, a specific example will be described later.

Here, the write pattern can be separated into the periodic write and the sustained write as described above referring to FIG. 4, so that both the items for the periodic write and for the sustained write may be used together.

The running job management information 440 shown in FIG. 8B includes the information of a job identifier 442 and a job activation time 444, managing all the jobs running at the time. For the individual job, the job management information 410 can be searched using the job identifier 442.

Figure 9A:
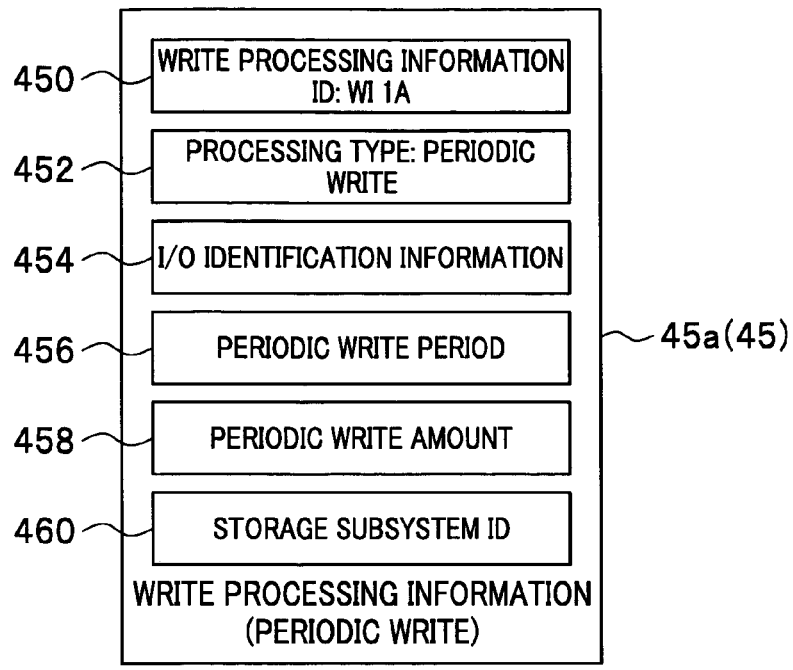
FIG. 9A is a diagram illustrating a write processing information in the case of a periodic write.
Figure 9B:
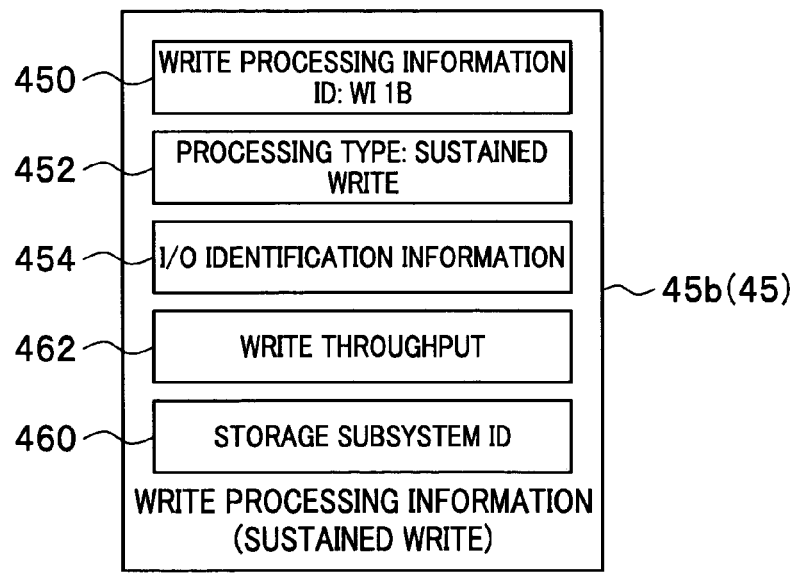
FIG. 9B is a diagram illustrating the write processing information in the case of a sustained write.
Figure 9C:
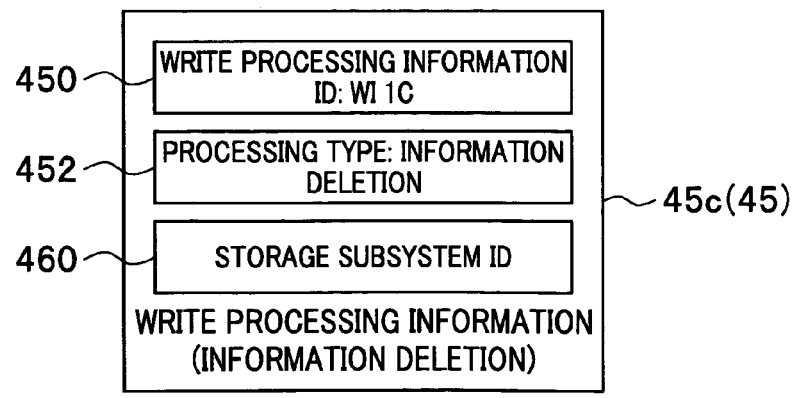
FIG. 9C is a diagram illustrating the write processing information in the case of an information deletion.

FIG. 9A is a diagram illustrating the write processing information in the case of periodic write, FIG. 9B illustrating the write processing information in the case of sustained write, and FIG. 9C illustrating the write processing information in the case of information deletion.

The write processing information 45a in the case of periodic write shown in FIG. 9A includes the information of write processing information ID 450, a processing type 452, an I/O identification information 454, a periodic write period 456, a periodic write amount 458, and a storage subsystem ID 460, respectively. The write processing information ID 450 is the identification information of the write processing information. Here, the write processing information 45 itself can be stored instead of the write processing information ID 450. The processing type 452 is the information to indicate whether the processing is the periodic write or the sustained write. The I/O identification information 454 records a destination logical disk drive (Logical Unit; LU) and an LBA (Logical Block Address) corresponding to an address in a logical disk of the LU. The periodic write period 456 and the periodic write amount 458 indicate the period and the write amount when the periodic write is performed, corresponding to the base write period 426 and the base write amount 428 shown in FIG. 8A, respectively. The storage subsystem ID 460 stores the information indicating to which storage subsystem 40 the data is transferred.

The write processing information 45b in the case of sustained write shown in FIG. 9B includes the write processing information ID 450, the processing type 452, the I/O identification information 454, a write throughput 462, and the storage subsystem ID 460. Here, the same components with FIG. 9A are assigned the same numerals. The write throughput 462 is a throughput in the sustained write, corresponding to the base write throughput 424 shown in FIG. 8A.

The write processing information 45c in the case of information deletion in FIG. 9C includes the write processing information 450, the processing type 452, and the storage subsystem ID 460. Here, the same components with FIG. 9A are assigned the same numerals. The write processing information 45c indicates that the CPU 12 of the storage subsystem 40 deletes the data in the storage subsystem 40 specified by each of the above-described items.

FIG. 10 is a diagram illustrating storage cache management information. The storage cache management information 480 includes a partitioned-cache ID 482, an LUID (a logical disk ID) 484, a cache amount 486, a write prioritization threshold value 488, a dirty data amount 490, an expected write throughput 492, a next-expected dirty data amount 494, a correction dirty data amount 496, and a HDD idling time write amount 498, wherein one entry is created to each of the partitioned-caches. The storage cache management information 480 is recorded into the memory 14 of the storage subsystem 40.

The partitioned-cache ID 482 is the identification information of the partitioned-cache, and the LUID (the logical unit ID) 484 is the identification information of the logical unit. The cache amount 486 is the cache amount assigned to the partitioned-cache. The write prioritization threshold value 488 is the threshold value for the control of giving higher priority to the write processing when the corresponding dirty data amount 490 exceeds this value, wherein the value is set by, for example, multiplying the total amount of the periodic write amount corresponding to the partitioned-cache by a predetermined margin factor for setting a margin for the write amount, or a predetermined rate (e.g., 50%) of the cache amount 486 is set.

The dirty data amount 490 records the data amount in the cache (the disk cache) 42, which differs from the data stored in the hard disk drive. Here, the value obtained by subtracting the dirty data amount 490 from the cache amount 486 is the writable cache amount of the partitioned-cache. The expected write throughput 492 is the expected throughput value when the write processing will be performed from the time point, and the next-expected dirty data amount 494 is the target value expected to be met when checked for the next time and identical to the result of subtracting the target of writable cache amount from the cache amount. The correction dirty data amount 496 is used in a second embodiment and thus described later. The HDD idling time write amount 498 records the write amount performed while the hard disk drive 16 is in the idle state with no read/write request.

FIG. 11 is a diagram illustrating write amount management information. The write amount management information 500 is held in the memory 14 of the storage subsystem 40 per each of the write processing information 45 shown in FIG. 9. The write amount management information 500 includes a previous write amount history update time 502, a partitioned-cache ID 504, a write processing information 506, a previous periodic write time 508, a periodic write state 510, a current write amount counter 512, a correction factor 514, and a write amount history 516.

The previous write amount history update time 502 records the time when the write amount history 516 is previously updated. The partitioned-cache ID 504 is the same as the partitioned-cache ID 482 in FIG. 10, though it refers here to the identification information indicating the partitioned-cache as the target of the write processing. The write processing information ID 506 includes the identification information of the write processing information 45 corresponding to the write amount management information 500.

The previous periodic write time 508, in the case of periodic write, stores the time when the write processing was performed in the previous period. The periodic write state 510 stores if the periodic write is in process or not, or the data is not the target of the periodic write. The current write amount counter 512 is the counter holding the write amount from the previous write amount history update time to the current time point. The correction factor 514 is the correction factor for indicating how much the actual value (the actual measurement value) of the write amount of the write processing information is different from the expected value thereof (e.g., the periodic write amount 458 in FIG. 9A or the write throughput 462 in FIG. 9B). The write amount history 516 is for recording the write amount at predetermined time intervals to examine the pattern for a certain duration.

Here, if there are a plurality of entries having the identical target (i.e., the I/O identification information 454 of the corresponding write processing information 45 are identical to each other) in the write amount management information 500, the actual data is stored in one entry while the pointer to the entry storing the data is recorded in the other entries, thereby preventing an inconsistency to be created among the data.

Access-Related Processing

The processing related to the access to the storage subsystem 40 for the computer system 1 based on the above-described configurations will now be described hereinbelow.

Activation Processing of Processing Management Program for Management Server

Figure 12:
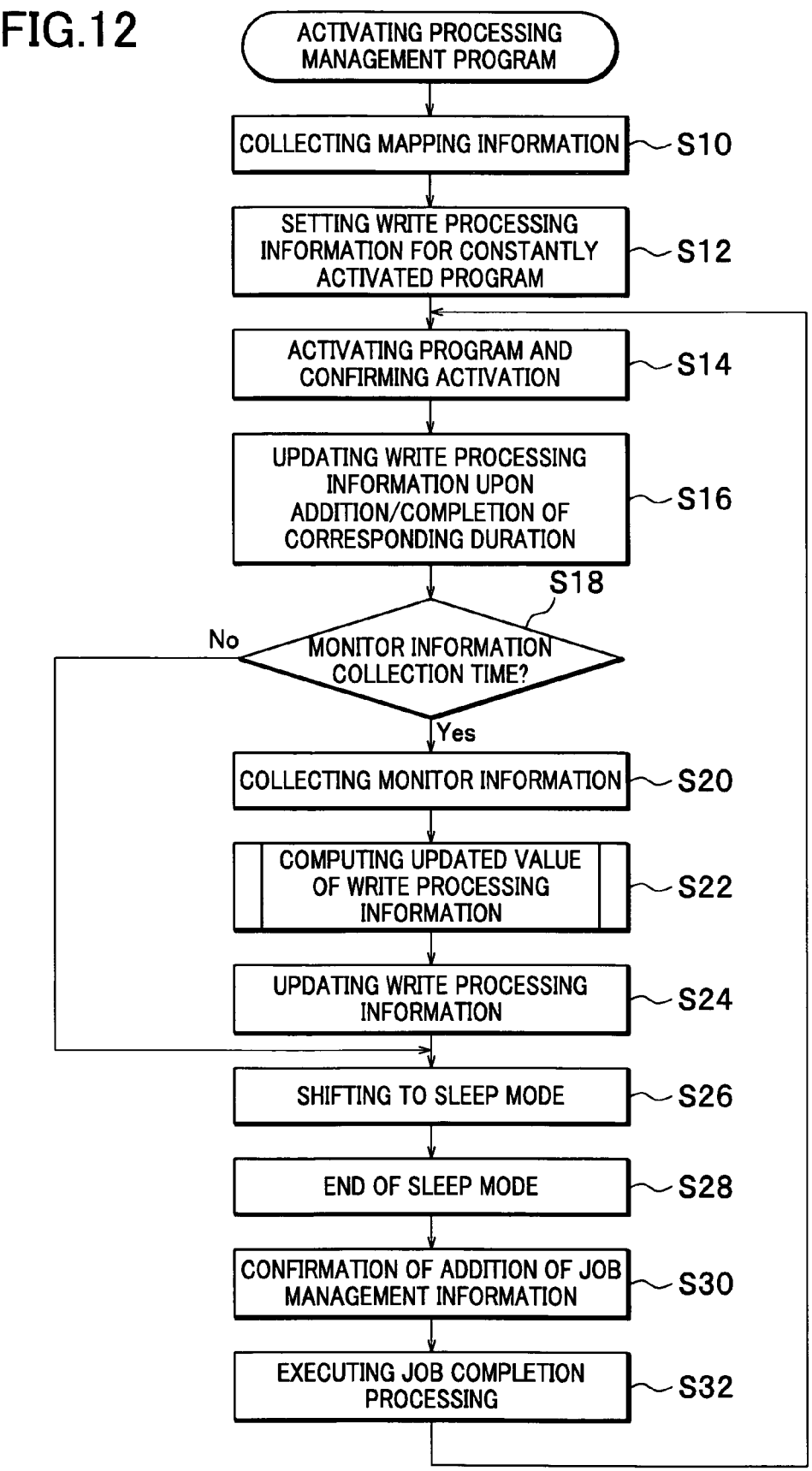
FIG. 12 is a schematic diagram illustrating an activation processing of a processing management program in a management server.

FIG. 12 is a schematic diagram illustrating an activation processing of the processing management program for the management server.

First, the CPU 12 of the management server 120 collects mapping information (S10). Next, the CPU 12 sets the write processing information 45 for a constantly activated program (S12). Then the CPU 12 activates and confirms the activation (including the setting of the write processing information corresponding the activated job) of the target (application) program 100 for the management at the activation date/time (S14), and updates the write processing information upon addition/completion of the corresponding duration (S16).

Next, the CPU 12 determines whether it is the monitored information collection time (S18), and if it is not the collection time (No in S18), the process proceeds to Step S26. Meanwhile, if it is the collection time (Yes in S18), the CPU 12 collects the monitored information (S20) and performs the updated value computation of the write processing information (S22). The updated value computation at step S22 will be described later in detail. The CPU 12 then updates the write processing information (S24), and the process proceeds to Step S26.

At step S26, the CPU 12 shifts to the sleep mode. After a predetermined duration, the CPU 12 comes out of the sleep mode (S28), and performs the confirmation of addition of the job management information (S30).

Then, the job completion processing is performed (S32), and the process returns to Step S14 and the processing is repeated. Here, the job completion processing refers to the following processings performed when the job completion is reported, i) processing to issue the deletion instruction of the write processing information 45 which is currently set determined by the corresponding job management information 410, ii) processing to clear (initialize to 0) the write processing information (the present set value) 438 in the job management information and the present set computation monitored value 434, and iii) processing to delete the corresponding entry in the running job management information 440.

Here, one should be aware of the following points in the steps with setting/updating the write processing information (Steps S12, S14, S16, and S24). As described by referring to FIG. 2, a certain file is allowed to map to a plurality of partitioned-caches. In this case, the new write processing information for the setting/updating will be created independently for each of the partitioned-caches. In this embodiment, the write processing property is managed for each file using the job management information, and the corrected value is set for the periodic write amount or the write throughput in the write processing information by taking the partition of the file into consideration. There are two major correction methods. One method is to partition the cache based on the data transfer amount obtained by monitoring, and the other is to partition the cache simply based on the data size. In practical processing, either method uses the above-described margin factor to set the margins for the write amount.

Figure 13:
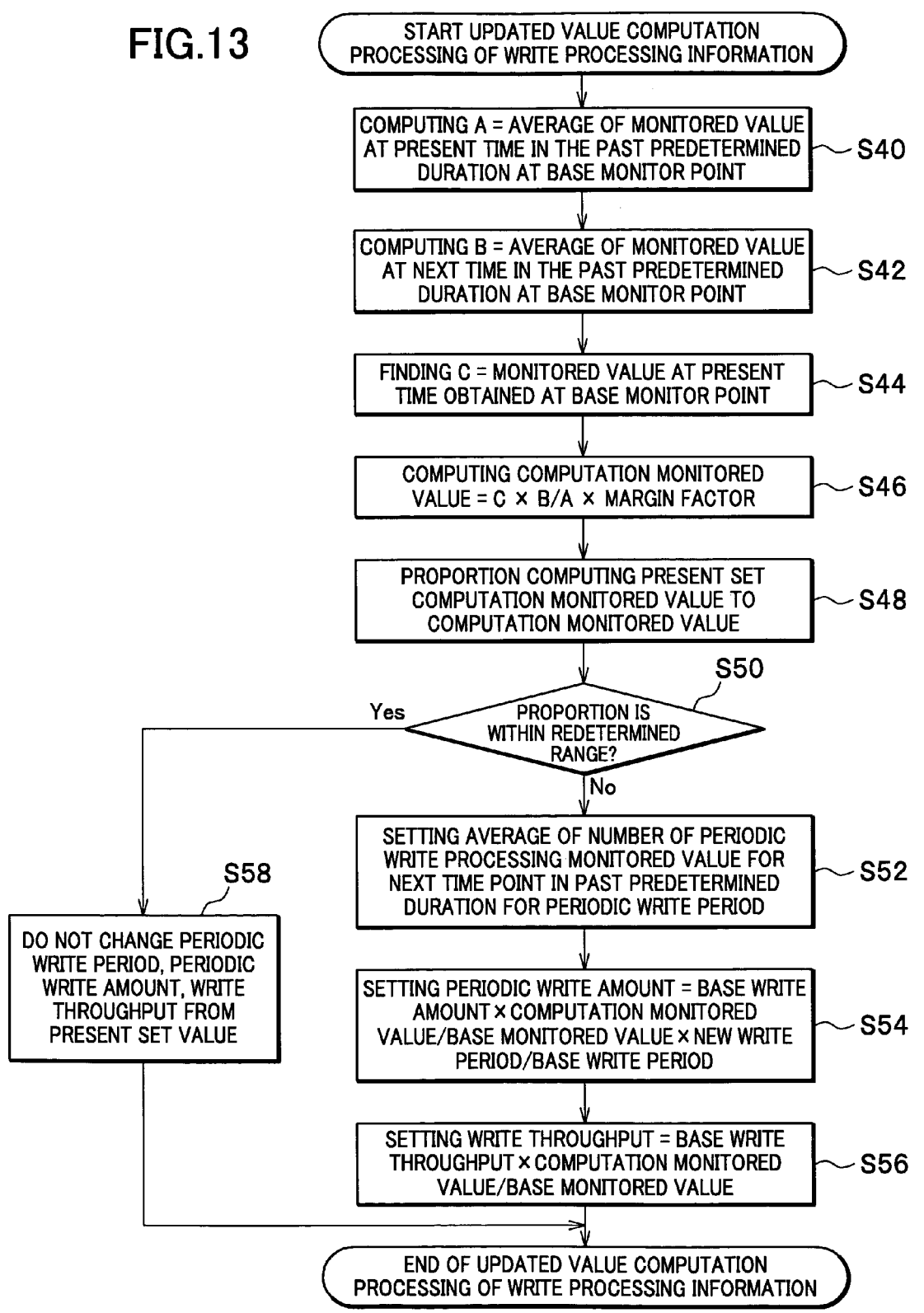
FIG. 13 is a detailed diagram of an updated value computation processing of the write processing information.

FIG. 13 is a detailed diagram of the updated value computation processing of the write processing information of Step S22 in FIG. 12. Here, the updated value computation is regarded to be executed by the CPU 12 of the server 120.

First, it computes the average of the monitored value at the present time point in the past predetermined duration at the base monitor point, and assigns the value to A (S40).

Next, it computes the average of the monitored value at the next time point in the past predetermined duration at the base monitor point, and assigns the value to B (S42). Then, it finds the monitored value at the present time point obtained at the base time point, and assigns the value to C(S44). In addition, it calculates C×B/A×the margin factor to obtain the computation monitored value (S46).

To give an actual example, if the present time point is March 24th, 9:00 P.M., Step S40 corresponds to the computation of the monitored value average at 9:00 P.M. for one week from the 16th to the 23rd of March. Step S42 corresponds to the computation of the monitored value average at 9:05 P.M. for one week from the 16th to the 23rd of March. Moreover, Step S44 corresponds to the computation of the monitored value at 9:00 P.M. of March 24th. That is, it is intended to predict the monitored value of the time point a bit ahead (relevant to Step S46) by calculating the ratio to the present monitored value obtained at step S44, using the measured results corresponding to the present time point and to the time point a bit ahead.

At step S48, the proportion of the present set computation monitored value (the previous computation result) to the computation monitored value obtained in the previous step is computed. The obtained proportion as the computation result is checked whether it is within a predetermined range (S50), and if it is (Yes in S 50), terminates the processing without changing the present values of the periodic write period, the periodic write amount, the write throughput, and the present set computation monitored value (S58).

If the proportion is out of the predetermined range (No in S50), the present set computation monitored value is updated to the computation result of this time, and the CPU 12 sets the average value of periodic write processings monitored values for the next time point in the past predetermined duration for the periodic write period (S52). Then the CPU 12 computes the periodic write amount=the base write amount×the computation monitored value/the base monitored value×a new write period/the base write period, and sets the result thereof as the periodic write amount (S54). Moreover, the CPU 12 computes the write throughput=the base write throughput×the computation monitored value/the base monitored value, and sets the result thereof as the write throughput (S56), and then terminates the processing.

Write Processing Information Acquisition Processing for Storage Subsystem

Figure 14:
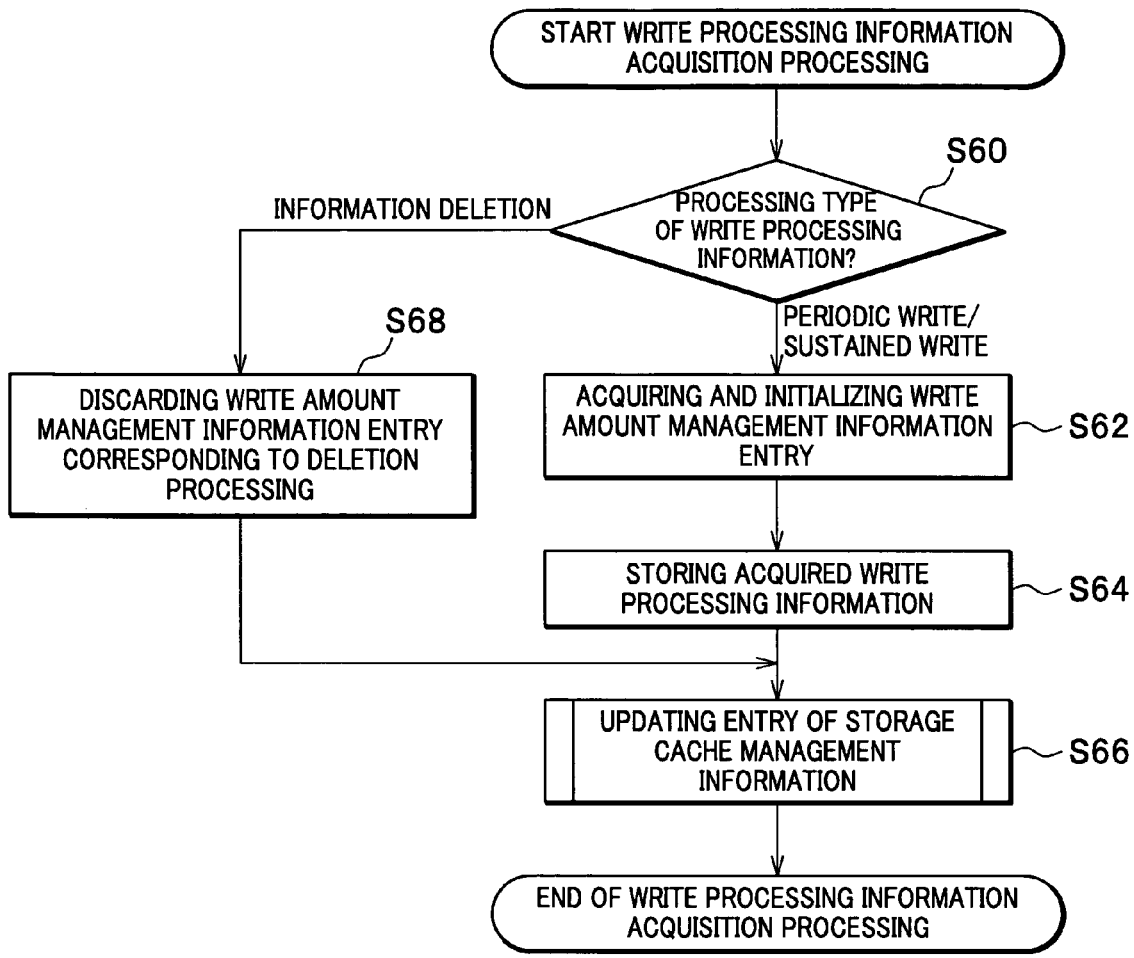
FIG. 14 is a diagram illustrating a write processing information acquisition processing in a storage subsystem.

FIG. 14 is a diagram illustrating a write processing information acquisition processing for the storage subsystem.

First, the CPU 12 of the storage subsystem 40 determines the processing type 452 of the write processing information 45 (S60). According to the determination result, if the processing type 452 is the information deletion ("INFORMATION DELETION" in S60), it discards the write amount management information entry corresponding to the acquired write processing information (S68), and proceeds to Step S66. If it is determined that the processing type is the periodic write or the sustained write ("PERIODIC WRITE/SUSTAINED WRITE" in S60), it acquires and initializes the write amount management information entry (S62), stores the acquired write processing information (S64), and then proceeds to Step S66.

At step S66, the entry of the storage cache management information 480 (see FIG. 10) corresponding to the acquired write processing information is updated, and the processing is terminated. The processing at step S66 is different between the first and second embodiments, the processing in the first embodiment will be described later by referring to FIG. 15.

Figure 15:
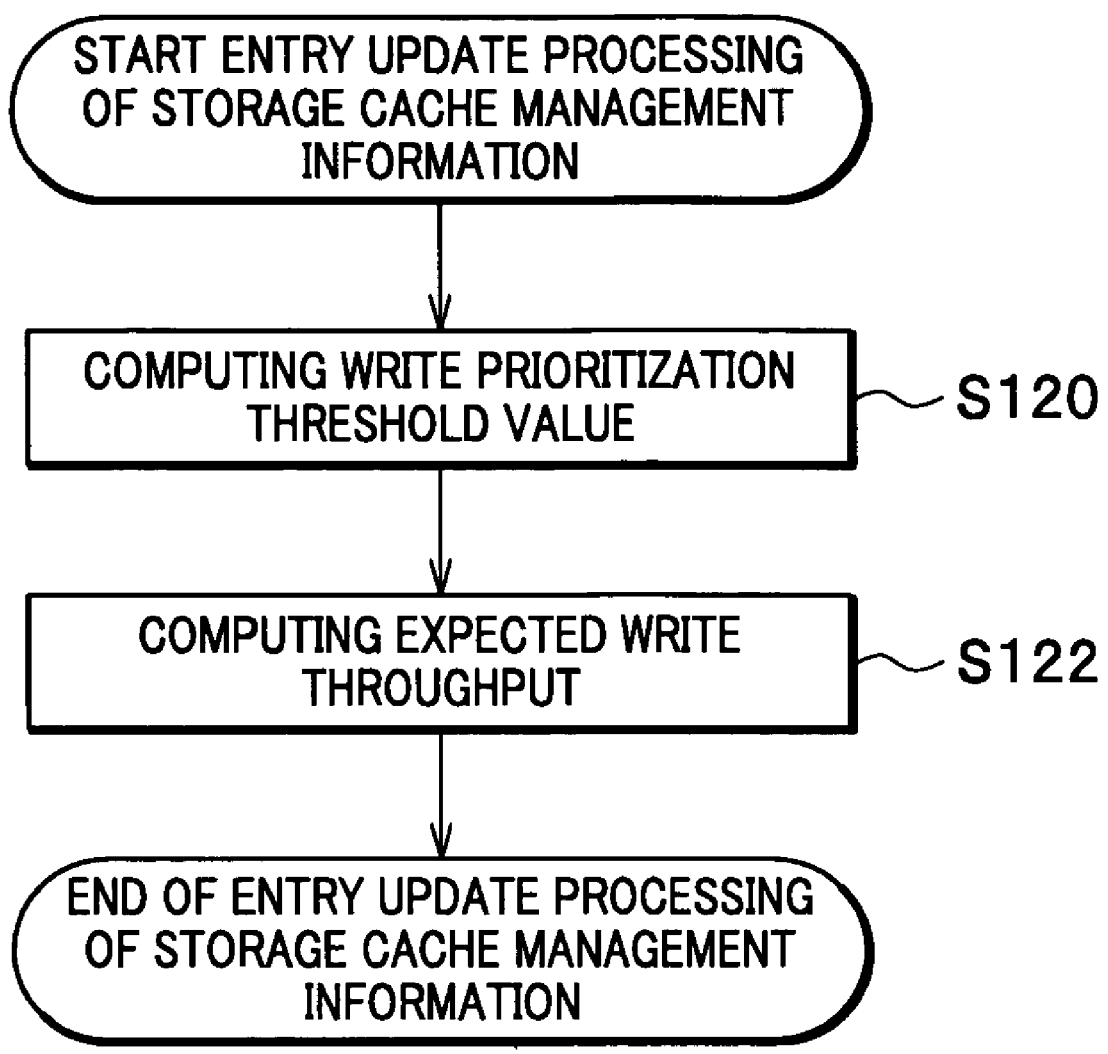
FIG. 15 is a diagram illustrating an entry update processing of the storage cache management information in the first embodiment.

FIG. 15 is a diagram illustrating the entry update processing of the storage cache management information in the first embodiment. In the processing, the CPU 12 of the storage subsystem 40 first performs the write prioritization threshold value computation (S120). The write prioritization threshold value is computed by the total amount of the periodic write amount corresponding to the partitioned-cache×the margin factor. However, if it exceeds the maximum setting value (for example, set to such as 50%), it sets the maximum setting value instead.

Next, the CPU 12 performs the computation of the expected write throughput 492 (see FIG. 10), and terminates the processing. Specifically, the expected write throughput 492 in the case of periodic write is computed by the periodic write amount/the periodic write period×the correction factor, or the write throughput is used as it is in the case of sustained write. Here, if a plurality of the write processing information corresponds to the partitioned-caches, the write throughput 492 is computed as the total amount thereof.

Figure 16:
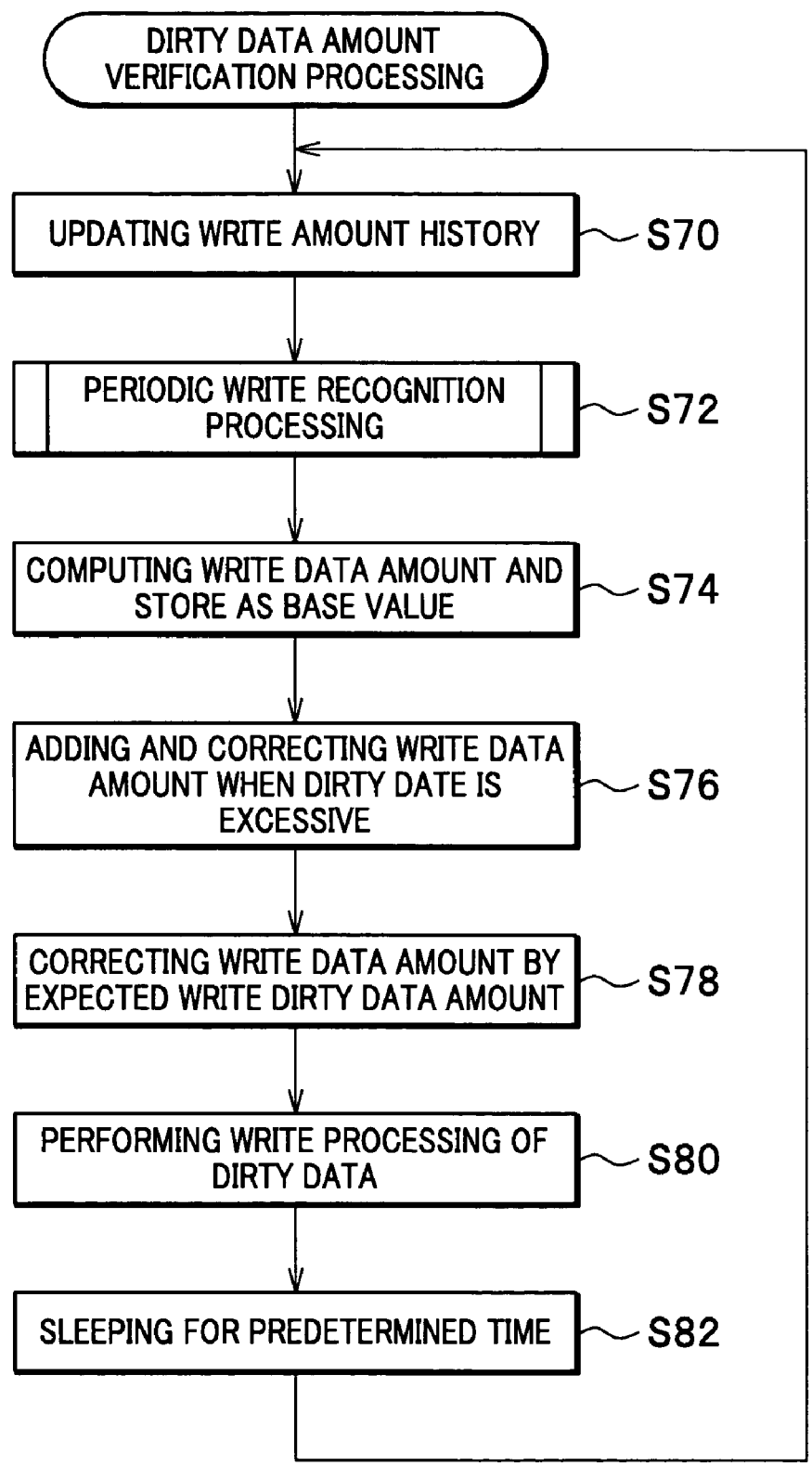
FIG. 16 is a diagram illustrating a dirty data amount verification processing in the storage subsystem in the first embodiment.

FIG. 16 is a diagram illustrating the dirty data amount verification processing in the storage subsystem in the first embodiment. The processing is performed periodically in the storage subsystem 40.

In this processing, the CPU 12 first updates the write amount history (S70). This updating is the processing to add the next entry. Here, if the write area is limited and the new entry cannot be allocated, the value is written into the entry of the oldest write amount history. Then the CPU 12 performs the periodic write recognition processing (S72). The periodic write recognition processing will be described later in detail by referring to FIG. 17.

Next, the CPU 12 computes the write data amount and stores the result as the base value for the succeeding Step S76 or Step S78 (S74). Specifically, the base value is computed by the expected write throughput×a verification interval–the HDD idling time write data amount. Here, the verification interval refers to the time interval from the previous check to the current check of the processing. In conjunction with the processing, it clears the HDD idling time write data amount to 0.

Then, when the dirty data amount is excessive (when the dirty data amount exceeds the write prioritization threshold value), addition and correction of the write data amount are performed (S76). Specifically, a predetermined rate (e.g., 5%) of the write amount exceeding the write threshold value (the dirty data amount–the write prioritization threshold value) is added to the write data amount to promote the internal write processing of the excessive dirty data. Here, if the dirty data amount does not exceed the write prioritization threshold value, no processing is performed.

Then, the write data amount is corrected by the expected dirty data amount (S78). Here, when the periodic write state of all the write processing information corresponding to the partitioned-caches are not in process, the following processing is performed. A predetermined rate (e.g., 5%) of the value calculated by the subtraction of the expected dirty data amount from the present dirty data amount is added to the write data amount, and the expected dirty data amount is updated to the result of subtraction of the computed value by multiplying the expected write throughput by the verification interval from the current expected dirty data amount.

Then, the write processing of the dirty data of the write data amount computed in the previous steps (S80) is performed. This corresponds to, in FIG. 4, performing the dirty write processing 312 and adding the write request to the HDD I/O queue. After the processing, the CPU 12 sleeps for a predetermined time (S82), and then the process is repeated from Step S70.

Figure 17:
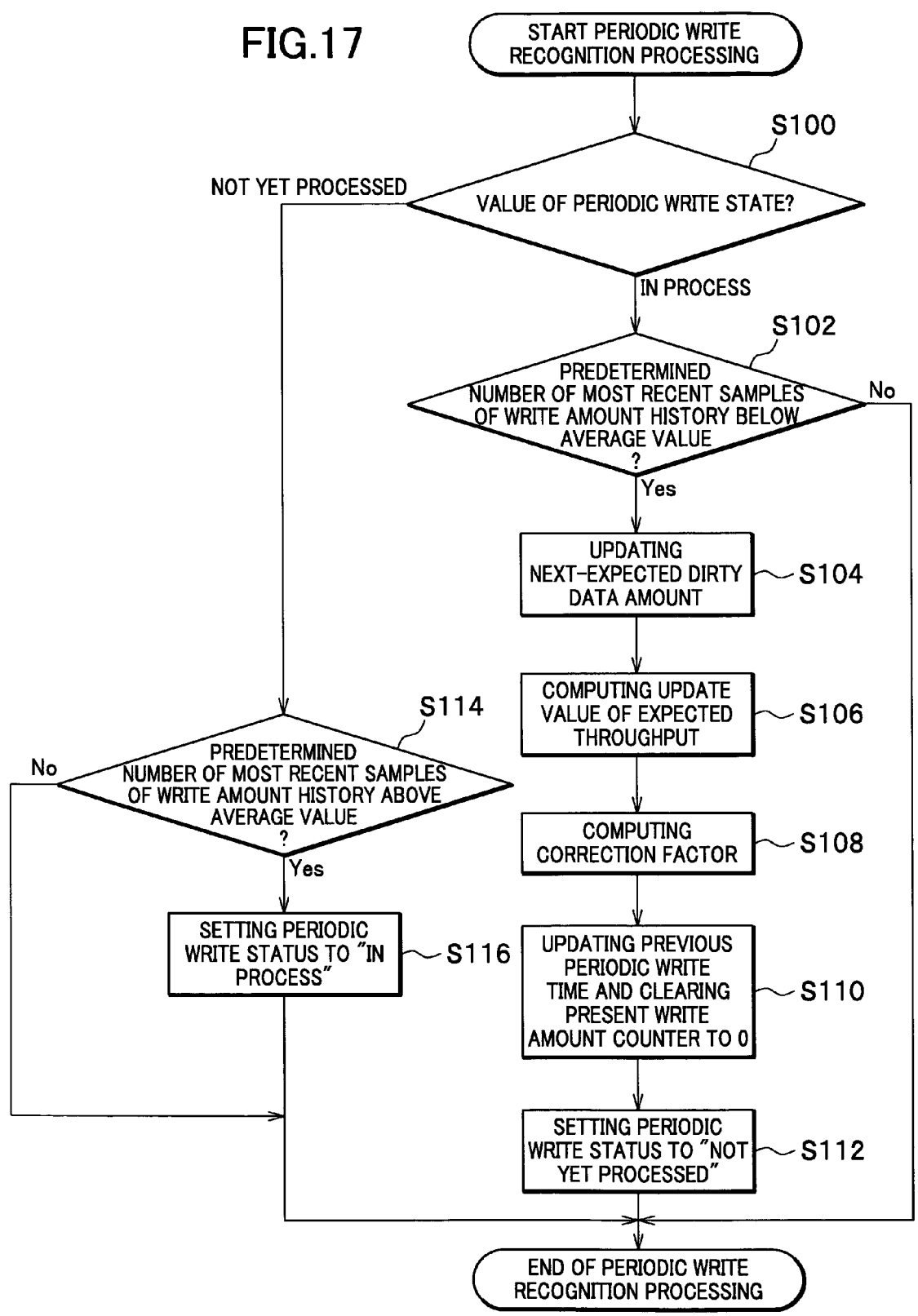
FIG. 17 is a diagram illustrating a periodic write recognition processing.

FIG. 17 is a diagram illustrating the periodic write recognition processing. This processing corresponds to Step S72 in FIG. 16. This processing is performed for each of the entry in the write amount management information 500.

In this processing, the CPU 12 first determines whether the periodic write status value shows it is in process or it has not yet been processed (S100). As a result, if it has not yet been processed ("NOT YET PROCESSED" in S100), the process proceeds to Step S114. If it is in process ("IN PROCESS" in S100), the CPU 12 determines whether a predetermined number of the most recent samples of the write amount history is below the average value (S102). As a result, if it is over the average value (No in S102), CPU 12 terminates the processing. If the value is below the average value (Yes in S102), which means that the periodic write processing is completed, the process proceeds to Step S104. Here, before the determination of Step S102, the write amount contained in the write amount history needs to be pre-processed by subtracting the portion for the sustained write computed from the write processing information and the correction factor.

At step S104, the next-expected dirty data amount 494 is updated (S104). Specifically, the write amount (of the periodic write) except for the sustained write amount from the previous periodic write time point to the present time point is added to the next-expected dirty data amount 494.

Next, the CPU 12 computes the expected throughput update value (S106). The value computed using the following equation (1) is added to the expected throughput.

The present write amount counter/the present
period–the periodic write amount in the write
processing information×the correction factor/the
periodic write period (1)

The present write amount counter/the periodic write
amount×the periodic write period/the present
period (2)

Wherein, the periodic write amount in the write processing information refers to the periodic write amount 458 of the target entry in the write amount management information 500 for the current processing. For the correction factor, the value computed at step S108 in the preceding processing is used. Moreover, the present period refers to the most recent period at the time point, which is specifically the duration from the previous periodic write to the present periodic write, that is, the difference between the previous periodic write time point and the present time point.

Next, the CPU 12 computes the correction factor (S108). The computation of the correction factor is performed using the above equation (2). Here, the values used here are the values computed from the present write amount and the write processing information.

Then, the CPU 12 updates the previous periodic write time point stored in the previous write amount history update time (the previous periodic write amount history update time) 502, clears the present write amount counter 512 to 0 (S110), sets the periodic write status to "NOT YET PROCESSED" (S112), and terminates the processing.

At step S114, it is determined whether a predetermined number of most recent samples of the write amount history is above the average value. As a result, if the value is below the average value (No in S114), the processing is terminated.

If the value is above the average value (Yes in S114), the periodic write status is set to "IN PROCESS" (S116), and the processing is terminated.

Figure 18:
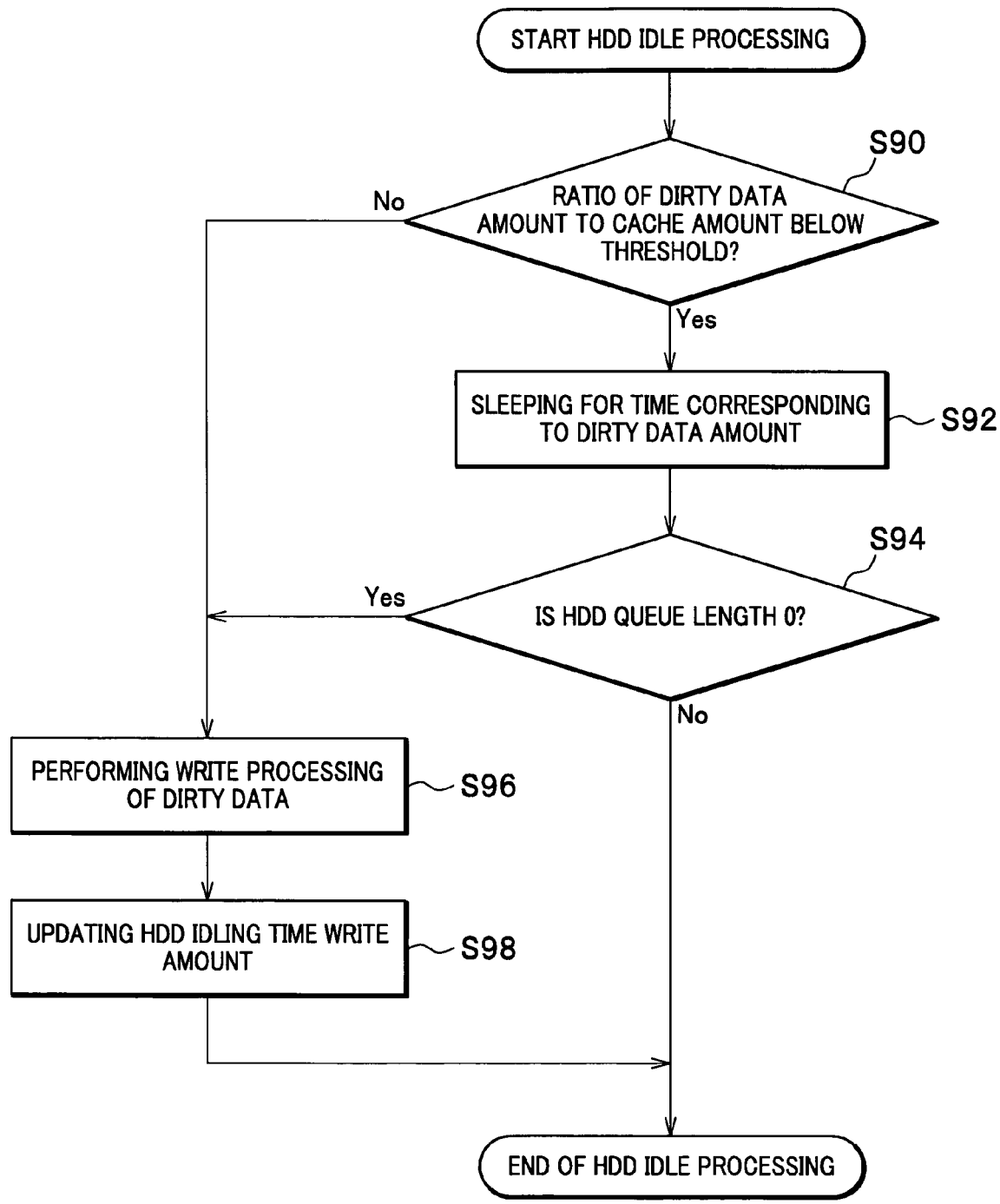
FIG. 18 is a diagram illustrating an idling processing of the hard disk drive.

FIG. 18 is a diagram illustrating the idling processing of the hard disk drive. This processing is performed when no request is provided to the above-described HDD queue.

In this processing, the CPU 12 first determines whether the ratio of the dirty data amount to the cache amount (the dirty data amount/the cache amount) is below a predetermined write prioritization threshold value (S90). As a result, if the value is above the write prioritization threshold value (No in S90), the process proceeds to Step S96. If the value is below the write prioritization threshold value (Yes in S90), the CPU 12 sleeps for the time period corresponding to the dirty data amount. That is, it sleeps for a short time when the dirty data amount is large, and sleeps for a long time when the dirty data amount is small.

Next, it is determined whether the HDD queue length is 0 (whether there is no request in the HDD queue). As a result, if the HDD queue length is not 0 (No in S94), the hard disk drive is not in the idle state, so that the processing is terminated. If the HDD queue length is 0 (Yes in S94), the process proceeds to Step S96.

At step S96, the CPU 12 performs the write processing of the dirty data. At this time, the write processing may be performed for a predetermined amount or the amount of one segment. Then, the CPU 12 updates the HDD idling time write amount 498 (S98), and the processing is terminated.

Figure 19:
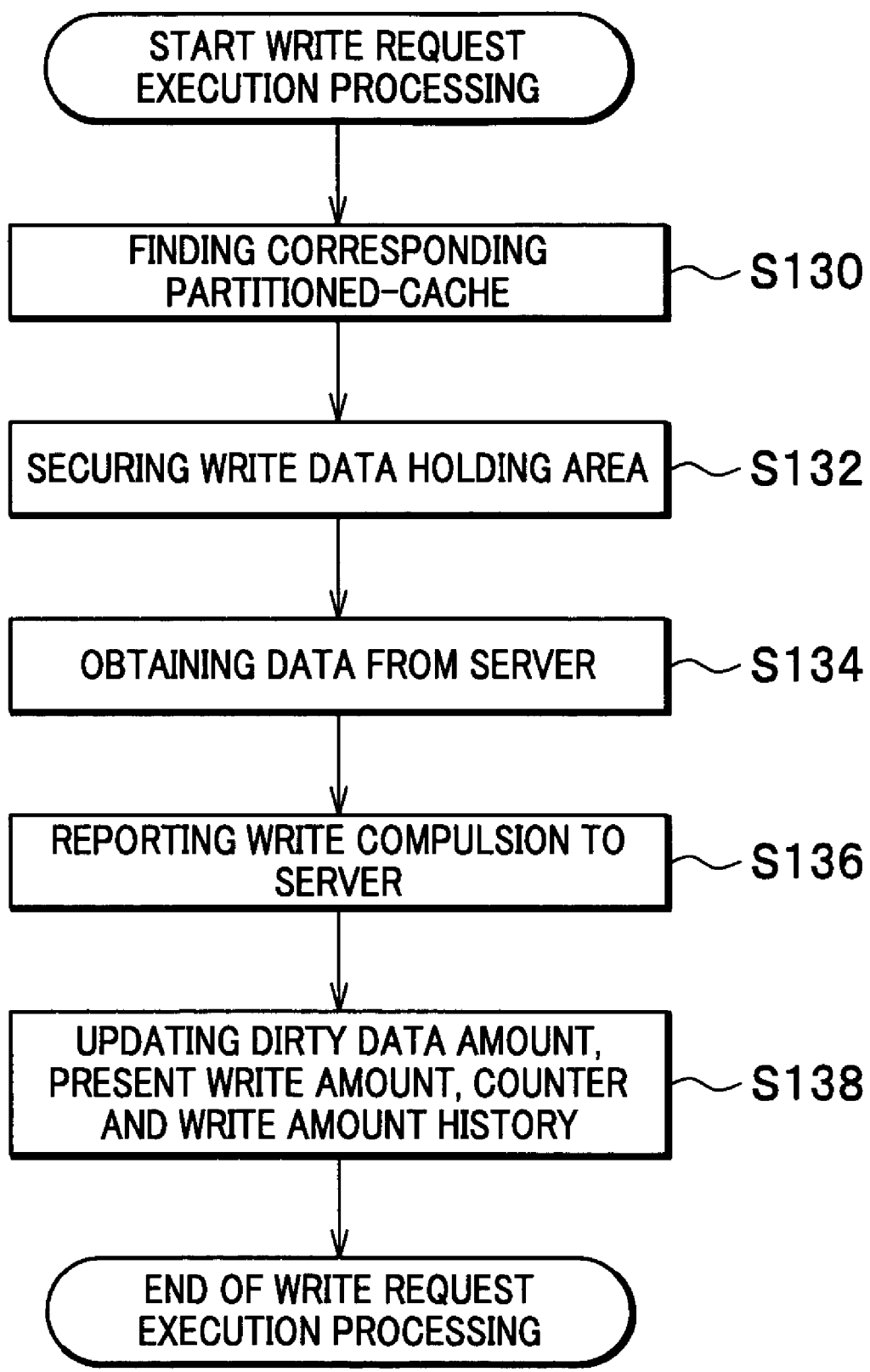
FIG. 19 is a diagram illustrating a write request execution processing.

FIG. 19 is a diagram illustrating the write request execution processing. The processing is performed when the storage subsystem 40 receives the write request from the server 70.

In this processing, the CPU 12 first finds the corresponding partitioned-cache (S130). At this time, the corresponding partitioned-cache is obtained from the identifier of the logical disk drive (LU) requesting the write using the storage cache management information 480.

Next, the CPU 12 secures the space for storing write data in the disk cache 42 (S132), and obtains the data from the server 70 (S134). Then, the CPU 12 reports a notice of write completion to the server 70 (S136). In this state, the written data is contained in the disk cache 42 of the storage subsystem 40. Last, the CPU 12 updates the dirty data amount 490 of the storage cache management information 480 (see FIG. 10), the present write amount counter 512 of the write amount management information 500 (see FIG. 11) and the write amount history 516 (S318), and then terminates the processing. After the completion of the processing, the write data from the server 70 is written internally to the hard disk drive 16 by the above-described dirty data amount verification processing (see FIG. 16) or the HDD idling processing (see FIG. 18).

According to the first embodiment, the computer system 1 is provided with the collection sections 12 and 144 (the CPU 12 and the management agent 144) for collecting the load information related to the application server (the server) 70 and the storage subsystem 40, the transmission section 144 for predicting the write processing property based on the load information collected by the collection sections 12 and 144, and for transmitting the write processing property to the storage subsystem, and the write control sections 12 and 44 (the CPU 12 and the control program 44) for controlling the write processing to the hard disk drive in the storage subsystem.

According to the above, the load information is collected related to the application server (the server) 70 and the storage subsystem 40, and the write processing can be performed systematically based on the write information obtained from the load information.

Moreover, according to the first embodiment, the load information includes the application processing amount of the application server 70 and the I/O load information of the storage subsystem 40.

According to the above, the write processing property can be configured based on the appropriate information.

Further, according to the first embodiment, the write processing property includes the monitored information as the measurement result of the previous write processing, the expected write execution interval and the expected data write amount derived by the margin factor for setting the margin for the write processing as well as the ratio of the monitored value of the most recent write processing to the monitored value of the previous write processing.

According to the above, the appropriate write processing can be designed using the write processing property.

Furthermore, according to the first embodiment, the write control sections 12 and 44 set the target of writable cache amount (identical to the result of subtracting the next-expected dirty data amount from the cache amount) for the write processing from the cache 42 to the hard disk drive 16 of the storage subsystem 40 to be averaged in terms of time, and perform the write processing to the hard disk drive 16 so as to satisfy the target of writable cache amount.

According to the above, while the write processing is averaged in terms of time and the appropriate writable cache amount is maintained, the write processing can be performed without affecting the read processing for the hard disk drive 16.

Still further, according to the first embodiment, the collection sections 12 and 144 and the transmission section 12 and 144 (the CPU 12 and the management agent 144) are provided in any one of the application server 70, the storage subsystem 40, and a device other than those (for example, the management server 120).

According to the above, the configuration of the computer system 1 can be determined flexibly.

Moreover, according to the first embodiment, the virtualization switch 60 stores the data managed by the file system by partitioning and mapping the data from the logical volume 204 to the logical disk drives 208.

According to the above, the file system 80 of the computer system 1 can be configured flexibly.

Further, according to the first embodiment, the collection sections 12 and 144 analyze the collected load information based on the period and predict the write processing property.

According to the above, the write processing property can be appropriately predicted.

From the above, utilizing the write processing information from the server 70, the storage subsystem 40 of the first embodiment can manage the write processing which aims to make the dirty data amount in the cache be the appropriate one. Then, even when the write requests are provided by the server 70 with high frequency, the access speed for the read request whose data is not stored in the disk cache 42 and should be read from the hard disk drive can be left unaffected by distributing the write request processing appropriately. Therefore, the storage subsystem capable of stably responding to the read request and the computer system capable of processing the application at the stable processing time can be provided.

Second Embodiment

While, in the above-described first embodiment, the writable cache amount is periodically verified and the internal write processing is performed when the value drops below the predetermined target value, the internal write control using the expected write throughput as the target value is performed in a second embodiment. Therefore, the second embodiment has common features with the first embodiment except that the management for the internal write processing is different, so that only different features of the second embodiment with that of the first embodiment will be described.

System Configuration

In this embodiment, the basic hardware configuration is completely the same as that described above, so that the description thereof will be omitted. However, since some of the tables hold different items with those in the first embodiment, only the different parts will be described.

In the storage cache management information 480 in FIG. 10, in the present embodiment, it uses the correction dirty data amount 496 which was not used in the first embodiment.

Among the write amount management information 500 in FIG. 11, from the previous periodic write time 508 through the present write amount counter 512 are not used in the present embodiment.

Other configurations are the same as the above-described first embodiment.

Access-Related Processing

The processing related to access to the storage subsystem 40 for the computer system 1 will be described based on the above-described configuration.

Compared to the first embodiment where the value for determining the write amount is updated for every short period and the write amount is predicted based on the updated value, in the second embodiment, instead of the expected value being obtained based on the period, the CPU 12 of the storage subsystem 40 corrects the write amount sequentially based on the expected write throughput. Moreover, based on the corrected value, the internal write is performed on average when the load of the internal I/O processing of the storage subsystem 40 is high, while the write amount is increased when the load of the internal I/O processing is low.

Figure 20:
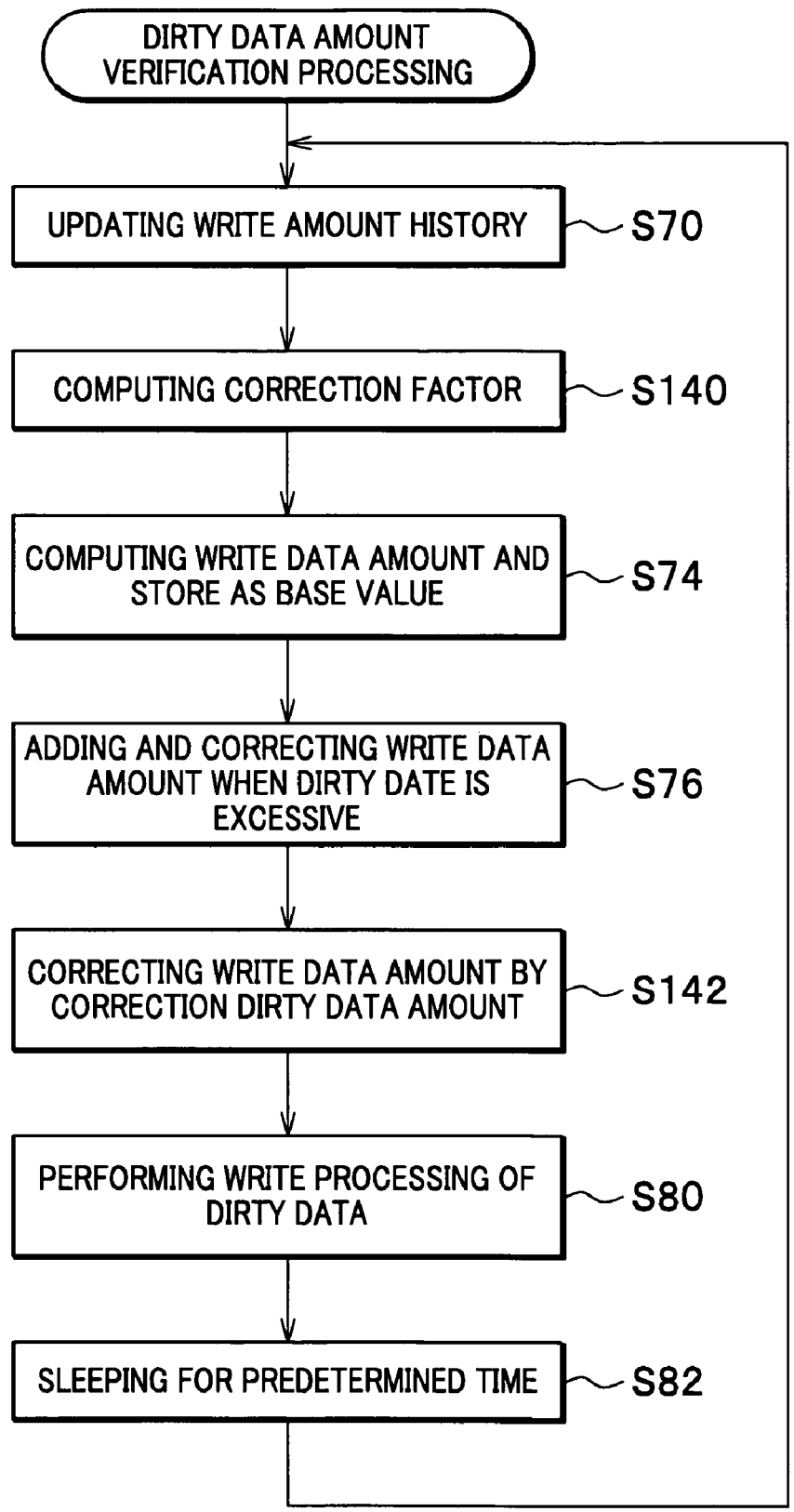
FIG. 20 is a diagram illustrating a dirty data amount verification processing according a the second embodiment.

FIG. 20 is a diagram illustrating the dirty data amount verification processing according to the second embodiment. The processing illustrated in FIG. 20 corresponds to the dirty data amount verification processing in FIG. 16 of the first embodiment, wherein the common steps are assigned the same numerals and the description thereof will be omitted.

In this processing, instead of the periodic write recognition processing in the first embodiment, the correction factor is computed (S140). Here, the correction factor is the rate indicating how much the actual write amount is different from the expected write amount in the write processing information.

Moreover, in contrast to the first embodiment where the write data amount is corrected by the expected dirty data amount, the second embodiment uses the correction dirty data amount to correct the write data amount (Sl42). Specifically, when the correction dirty data amount has the positive value, a predetermined amount (e.g., 32 kB) is subtracted from the correction dirty data amount. Then, the correction is performed by adding the subtracted portion of the correction dirty data amount to the write data amount. If the write data amount is still negative after the predetermined amount is added, the absolute value thereof (the value with the switched sign) is subtracted from the correction dirty data amount and the write data amount is set to 0.

FIG. 21 is a diagram illustrating the entry update processing of the storage cache management information according to the second embodiment.

While, in the first embodiment, the processing performs only Step S120 of the write prioritization threshold value computation and Step S122 of the expected write throughput computation, the setting of the correction dirty data amount (S150) as well as the above two steps are performed in the second embodiment. In this step, the present dirty data amount is generally used for setting the correction dirty data amount.

While the second embodiment will be described above, according to this embodiment, similar to the above-described first embodiment, even when the write requests are provided by the server 70 with high frequency, the access speed for the read request whose data is not stored in the disk cache 42 and should be read from the hard disk drive 16 can be left unaffected by distributing the write request processing appropriately. Moreover, since the management processing is simplified compared to the first embodiment, the utilization of the computer resource can be reduced particularly for the management processing in the storage subsystem 40.

Although both the first and second embodiments use the configuration shown in FIG. 1 as the basis, the present invention can be applied to different configurations as long as the mapping from the file 202 to the partitioned-cache 210 is designated. That is, the configuration can adapt the structure not including the virtualization switch 60. In this case, the mapping is designated directly from the logical volume 204 to the logical disk drive 208.

Moreover, it may be structured so as not to include the volume manager 78. In this case, the file system 80 designates the mapping directly to the virtual volume 206 or the logical disk drive 208. Furthermore, the present invention can be applied to the configuration where the storage subsystem 40 provides the file 202. The storage system 40 in this configuration is the one referred to as so called NAS (Network Attached Storage).

The embodiments of the present invention can be modified within the scope of the present invention. For example, the internal write processing can be distributed by the write amount management method different from the methods described in the above two embodiments, or the function of the management server can be performed by the application server or the storage subsystem.

What is claimed is:

1. A computer system, comprising:
   a collection section for collecting load information related to an application server and a storage subsystem;
   a transmission section for predicting a write processing property based on the load information collected by the collection section and for transmitting the write processing property to the storage subsystem; and
   a write control section for controlling a write processing to a hard disk drive in the storage subsystem based on the write processing property transmitted by the transmission section
   wherein the write processing property includes monitored information as the measurement result of a previous write processing, a margin factor for setting a margin for the write processing, an expected write execution interval derived by a ratio of a monitored value of a most recent write processing to a monitored value of a previous write processing, and an expected data write amount.

2. The computer system according to claim 1, wherein the load information includes an application processing amount of the application server and I/O load information of the storage subsystem.

3. The computer system according to claim 1, wherein the write control section sets a target of writable cache amount for the write processing from a cache memory to the hard disk drive of the storage subsystem to be averaged in terms of time, and performs the write processing to the hard disk drive so as to satisfy the target of writable cache amount.

4. The computer system according to claim 1, wherein the collection section and the transmission section are included in any one of the application server, the storage subsystem, and a device other than those.

5. The computer system according to claim 1, further comprising:
    a virtualization switch for configuring a virtual volume by which a part of storage region in a logical volume of the application server are mapped to a part of storage region of a logical disk drive in the storage subsystem,
    wherein the virtualization switch stores the data managed by a file system by partitioning and mapping data from the logical volume to the logical disk drive.

6. The computer system according to claim 1, wherein the collection section analyzes the collected load information based on a period to predict the write processing property.

7. The computer system according to claim 1, further comprising:
    a virtualization switch for configuring a virtual volume by which a part of storage region in a logical volume of the application server are mapped to a part of storage region of a logical disk drive in the storage subsystem,
    wherein the load information includes the application processing amount of the application server and the I/O load information of the storage subsystem,
    the write control section sets the target of writable cache amount for the write processing from the cache memory to the hard disk drive of the storage subsystem to be averaged in terms of time, and performs the write processing to the hard disk drive so as to satisfy the target of writable cache amount,
    the collection section and the transmission section are included in any one of the application server, the storage subsystem, and a device other than those,
    the virtualization switch stores the data managed by the file system by partitioning and mapping the data from the logical volume to the logical disk drive, and
    the collection section analyzes the collected load information based on the period to predict the write processing property.

8. A computer system, comprising:
    a cache memory for temporarily storing write data;
    a storage section for storing a write processing property;
    a processor for analyzing the write processing property stored in the storage section and determining a write processing speed;
    a write control section for controlling a write processing based on the write processing speed; and
    a hard disk drive for storing the write data stored in the cache memory under the control of the write control section
    wherein the write processing property includes monitored information as the measurement result of a previous write processing, a margin factor for setting a margin for the write processing, an expected write execution interval derived by a ratio of a monitored value of a most recent write processing to a monitored value of a previous write processing, and an expected data write amount.

9. The computer system according to claim 8, wherein the write control section sets a target of writable cache amount for the write processing from a cache memory to the hard disk drive to be averaged in terms of time, and performs the write processing to the hard disk drive so as to satisfy the target of writable cache amount.

10. The computer system according to claim 9, wherein the processor computes the target of writable cache amount based on the write processing property.

11. A write processing control method executed by a computer system, comprising:
    a collection section; a transmission section; and a write control section,
    wherein the collection section collects load information related to an application server and a storage subsystem,
    the transmission section predicts a write processing property based on the load information collected by the collection section and transmits the write processing property to the storage subsystem, and
    the write control section controls a write processing to a hard disk drive in the storage subsystem based on the write processing property transmitted by the transmission section
    wherein the write processing property includes monitored information as the measurement result of a previous write processing, a margin factor for setting a margin for the write processing, an expected write execution interval derived by a ratio of a monitored value of a most recent write processing to a monitored value of a previous write processing, and an expected data write amount.

12. The write processing control method according to claim 11, wherein the load information includes an application processing amount of the application server and I/O load information of the storage subsystem.

13. The write processing control method according to claim 12, wherein the collection section and the transmission section are included in any one of the application server, the storage subsystem, and a device other than those.

* * * * *